Feb. 17, 1959 W. C. HODGES ET AL 2,873,502
SYSTEM AND APPARATUS FOR HANDLING
TRANSPORTABLE CONTAINERS
Filed Oct. 31, 1949 18 Sheets-Sheet 1

INVENTORS
William C. Hodges
BY Alexander L. Robb.
Cameron, Kerkam + Sutton
ATTORNEYS

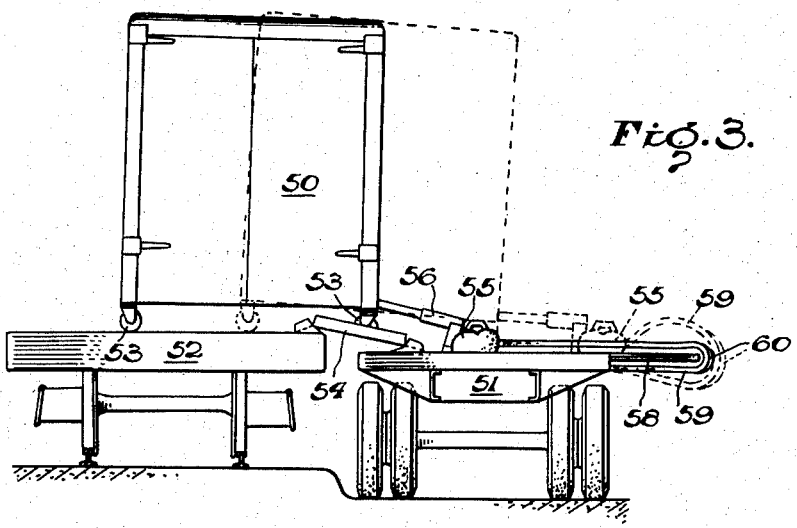
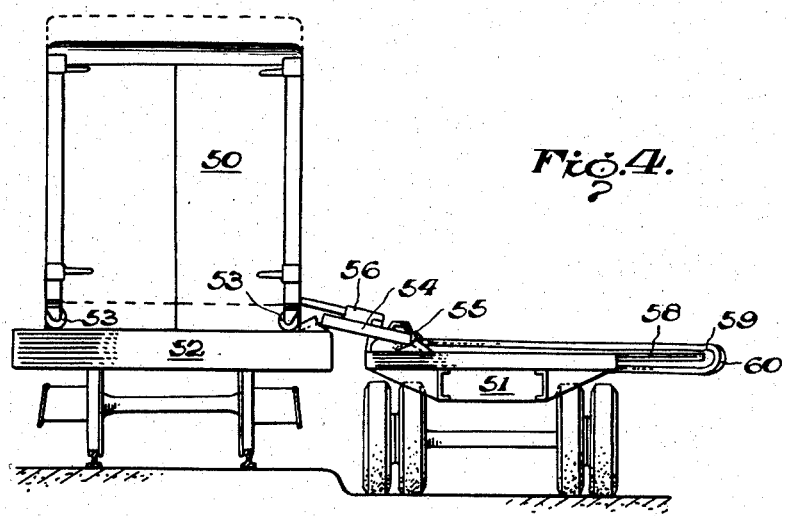

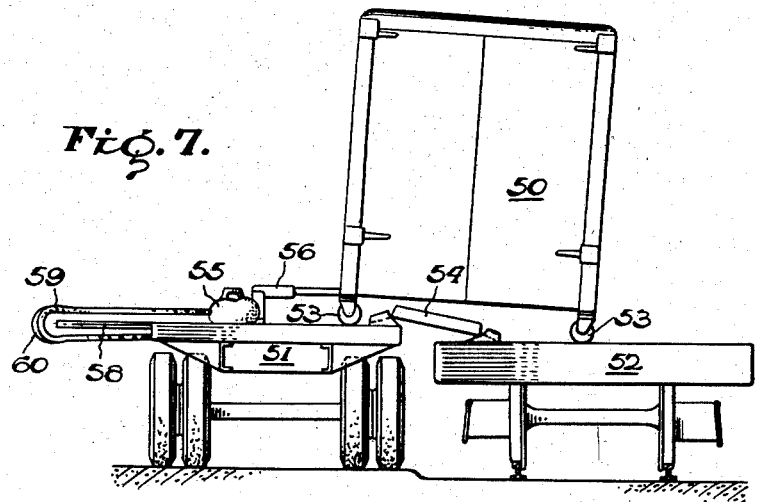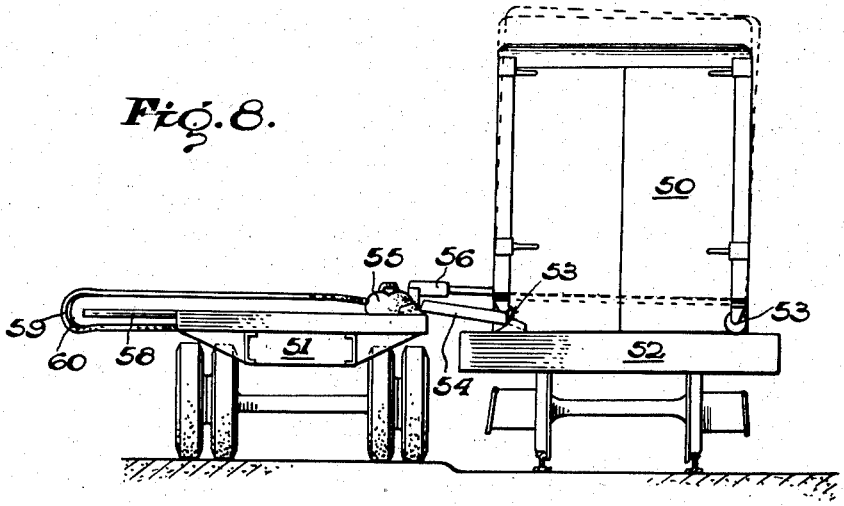

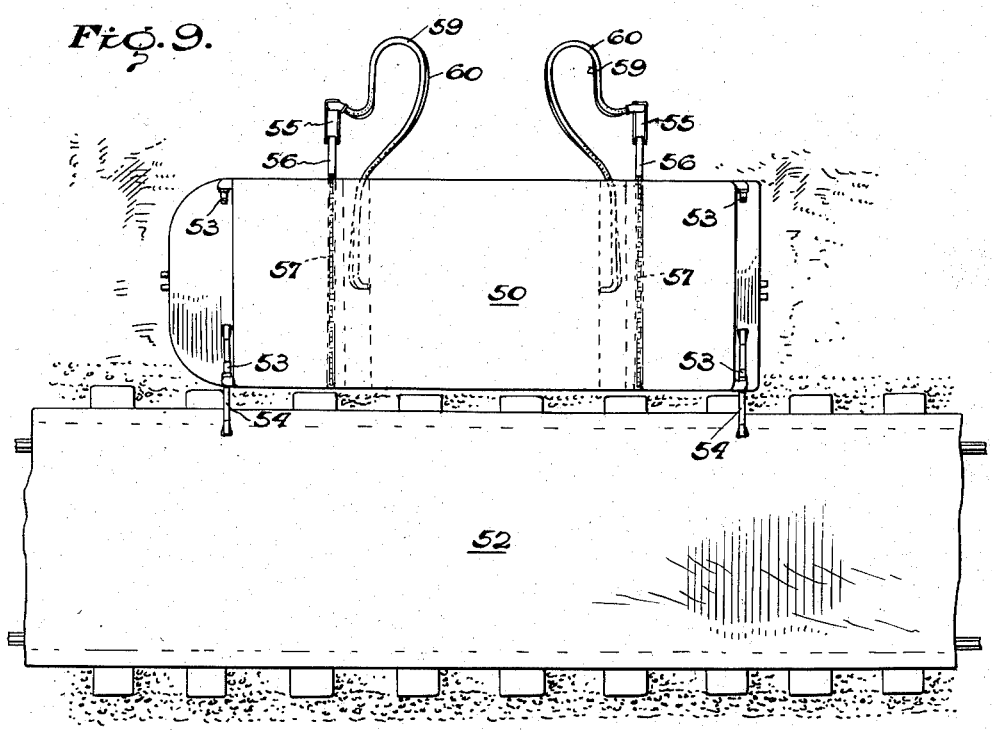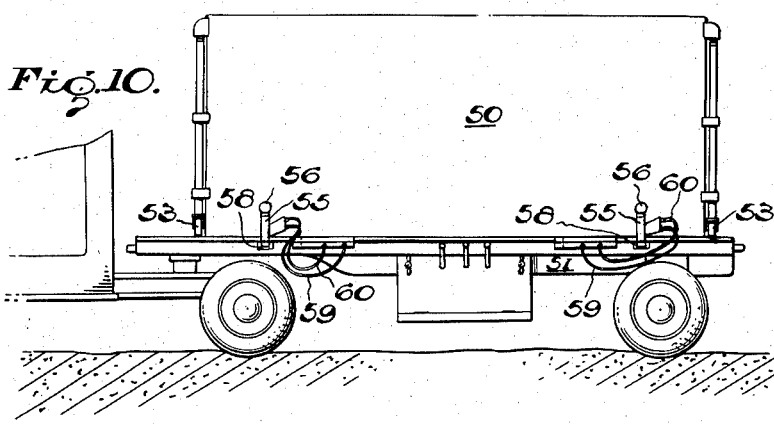

Feb. 17, 1959
W. C. HODGES ET AL
2,873,502
SYSTEM AND APPARATUS FOR HANDLING
TRANSPORTABLE CONTAINERS
Filed Oct. 31, 1949
18 Sheets-Sheet 6
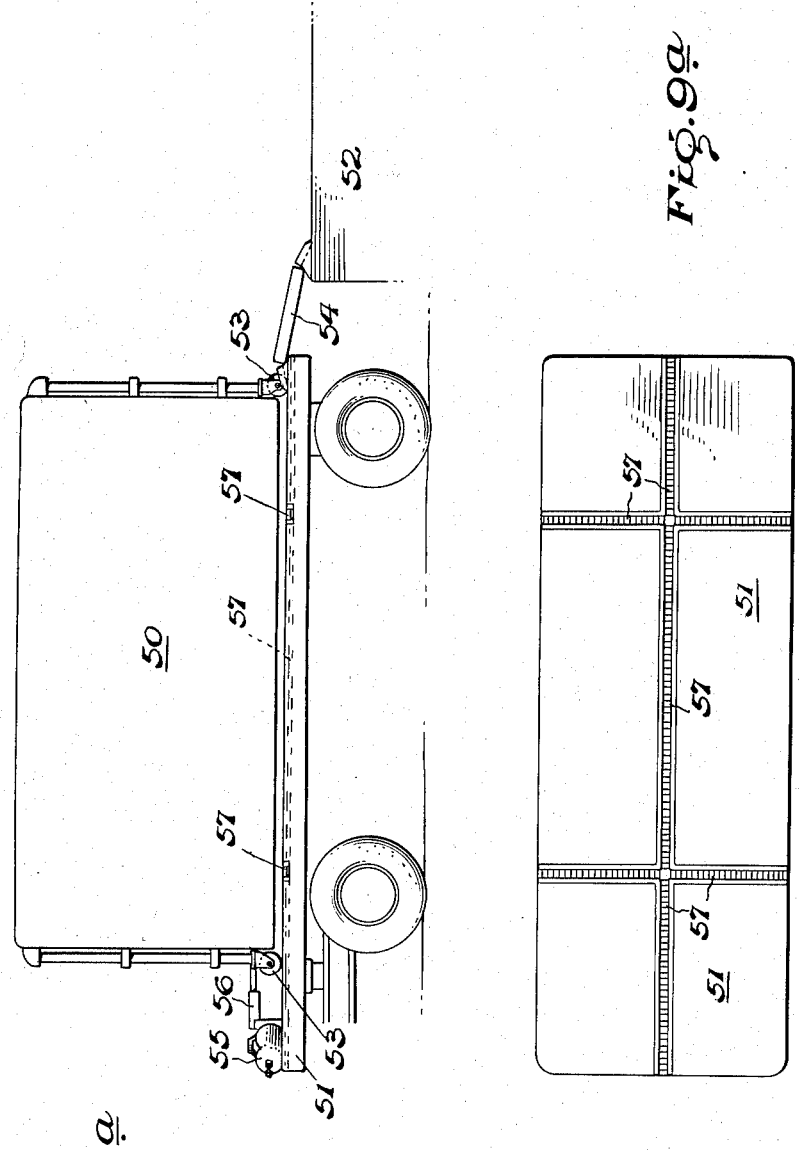
INVENTORS
William C. Hodges
Alexander L. Robb.
BY
Cameron, Kerkam + Sutton
ATTORNEYS

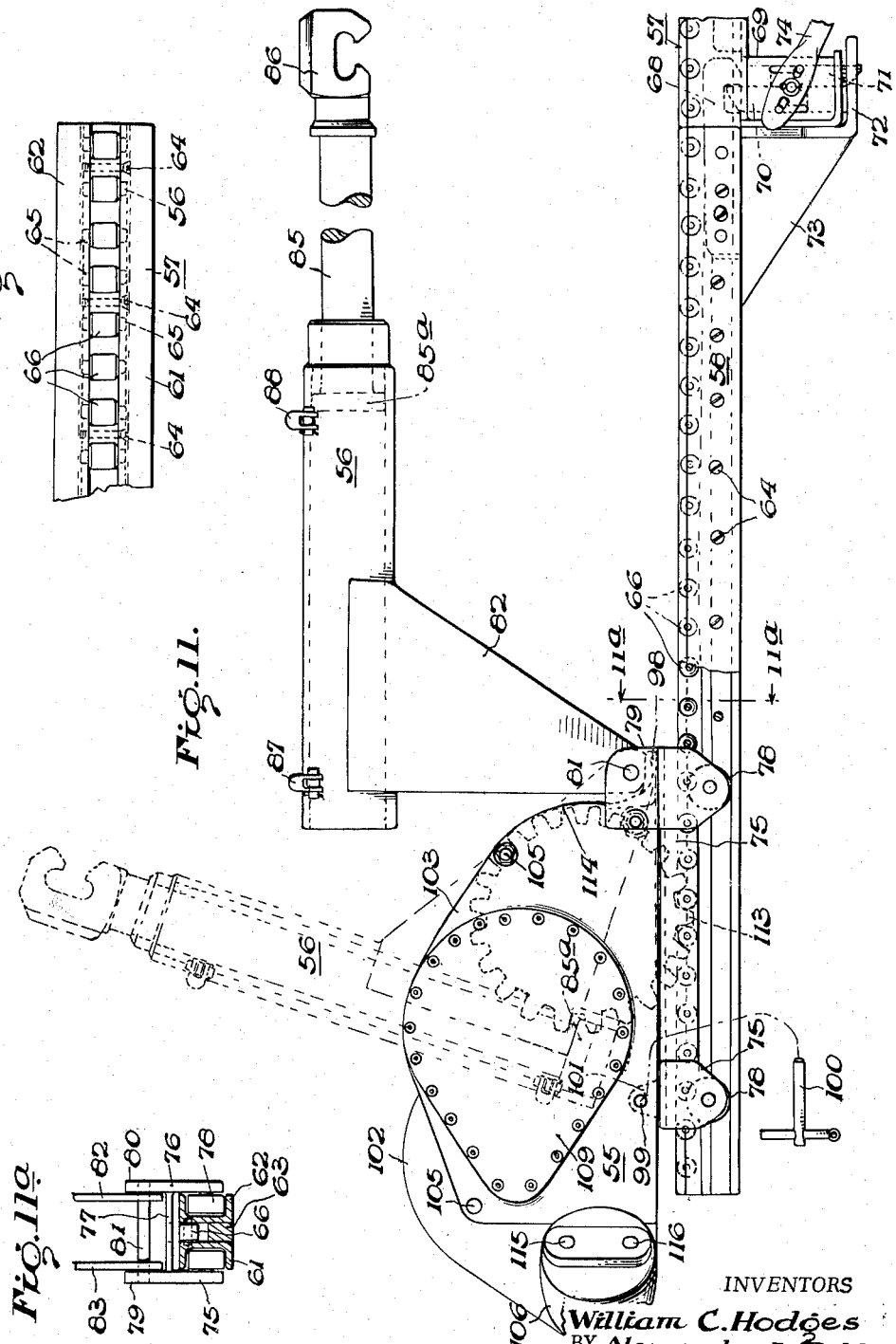

Feb. 17, 1959
W. C. HODGES ET AL
SYSTEM AND APPARATUS FOR HANDLING
TRANSPORTABLE CONTAINERS
2,873,502
Filed Oct. 31, 1949
18 Sheets-Sheet 8
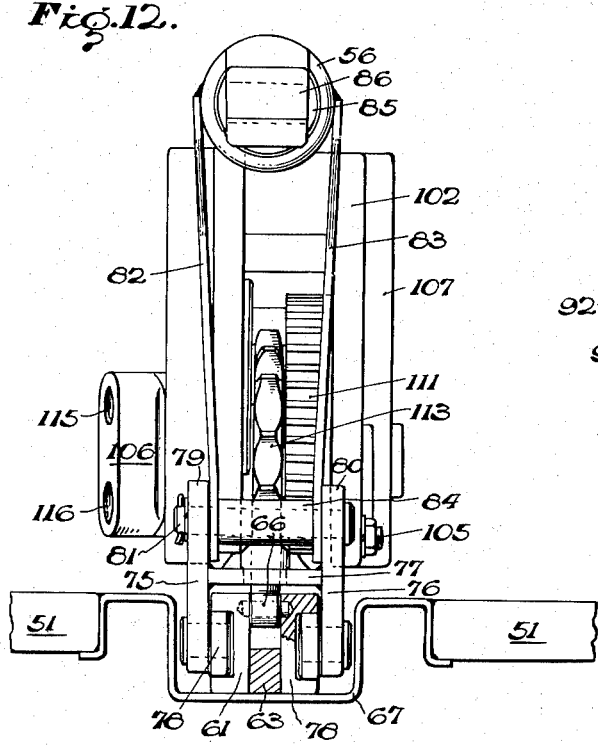
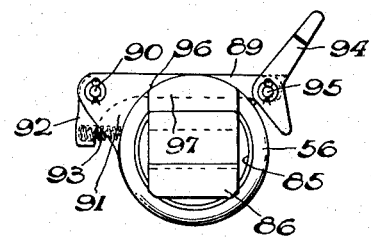
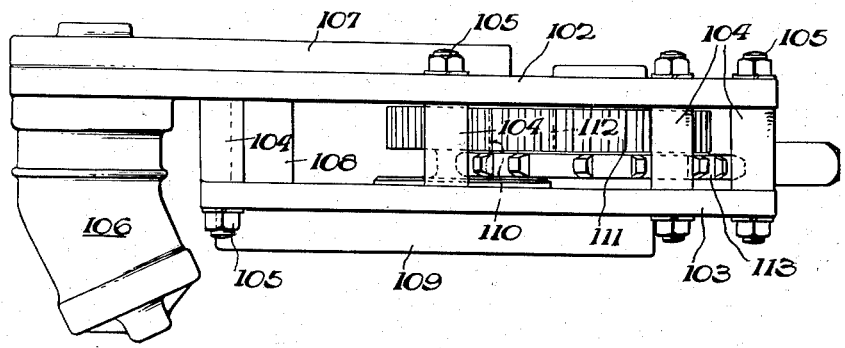
INVENTORS
William C. Hodges
BY Alexander L. Robb.
Cameron, Kerkam & Sutton
ATTORNEYS

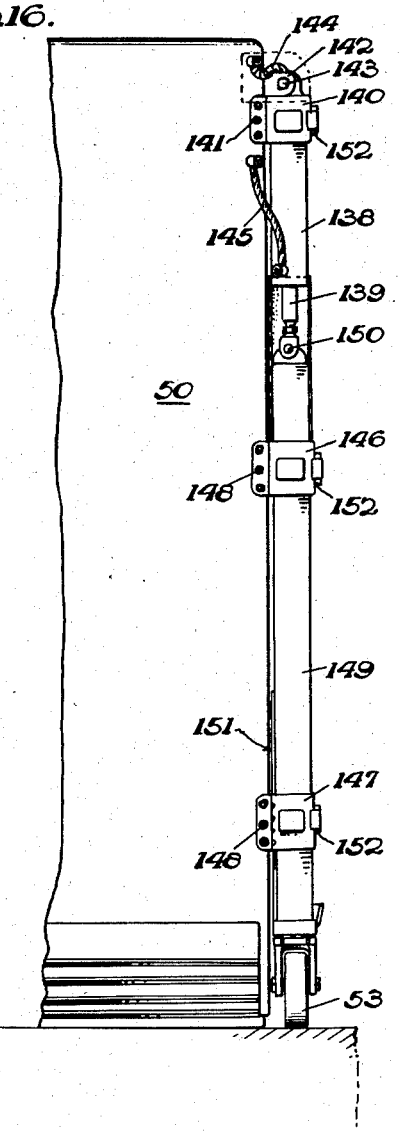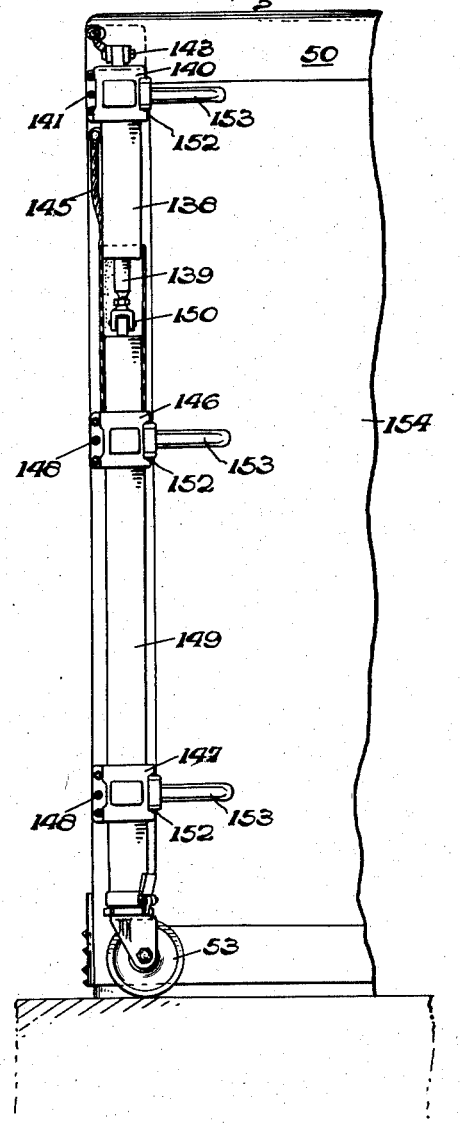

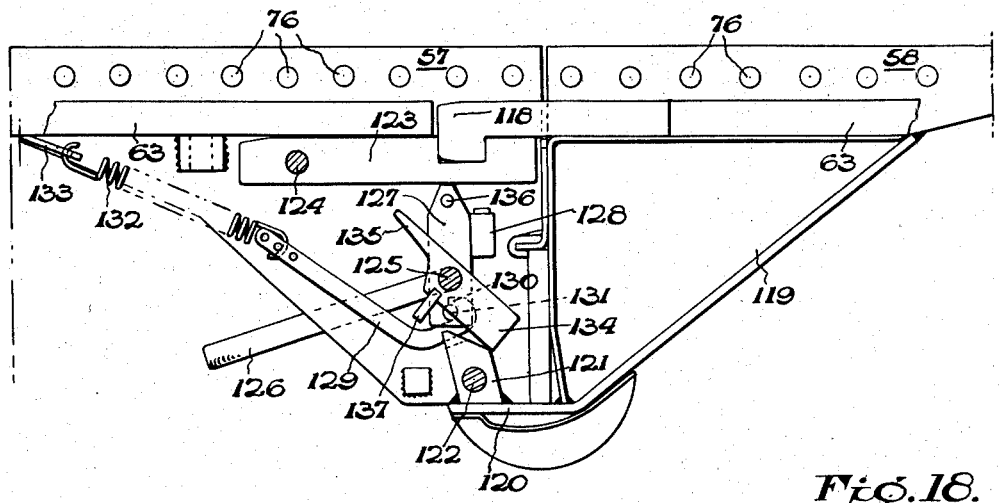
Fig. 18.ª
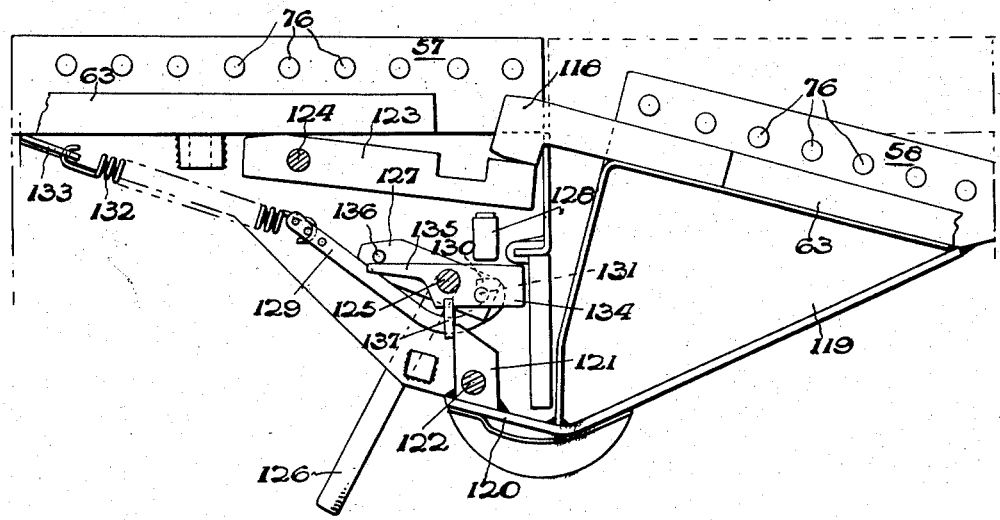
Fig. 18.

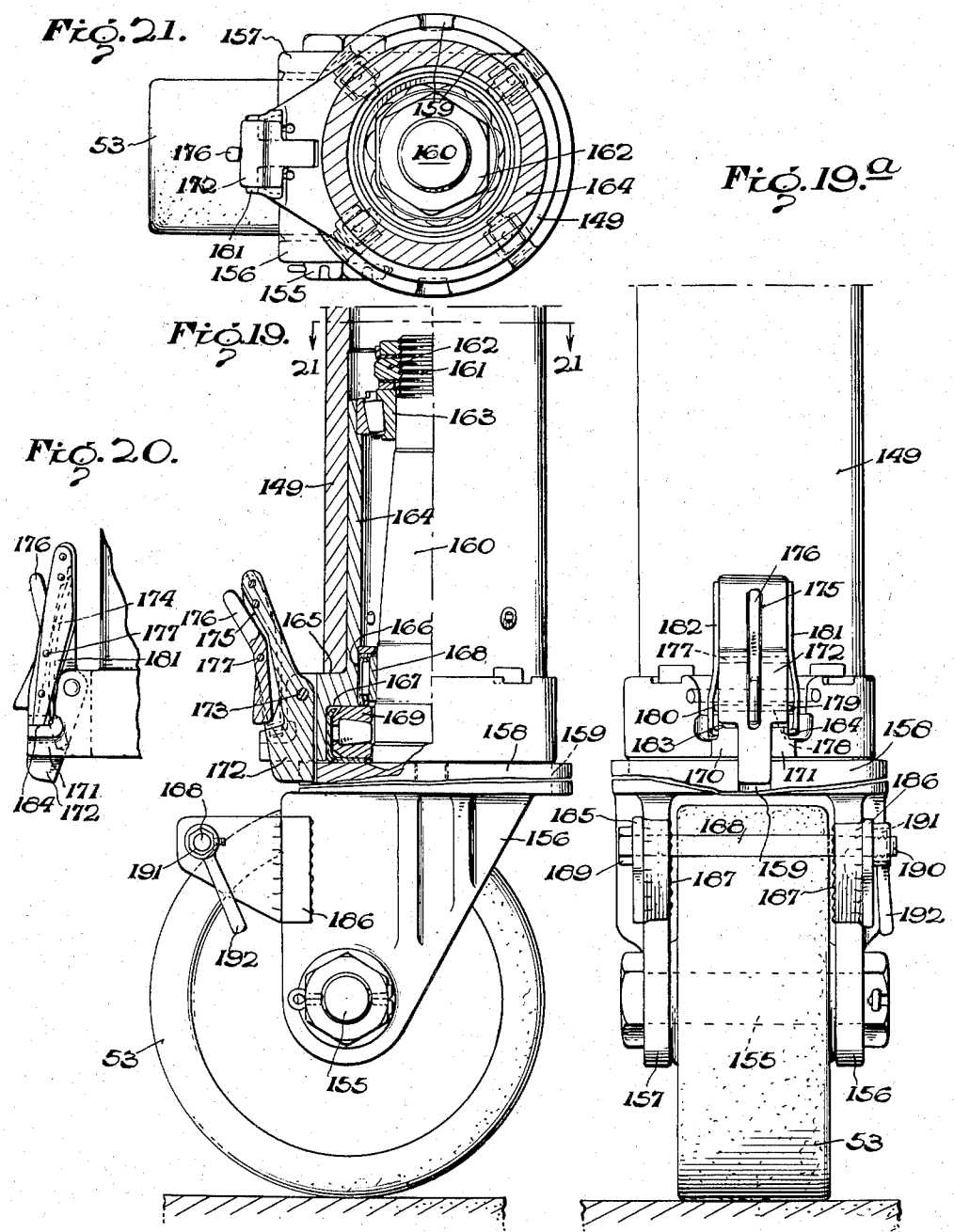

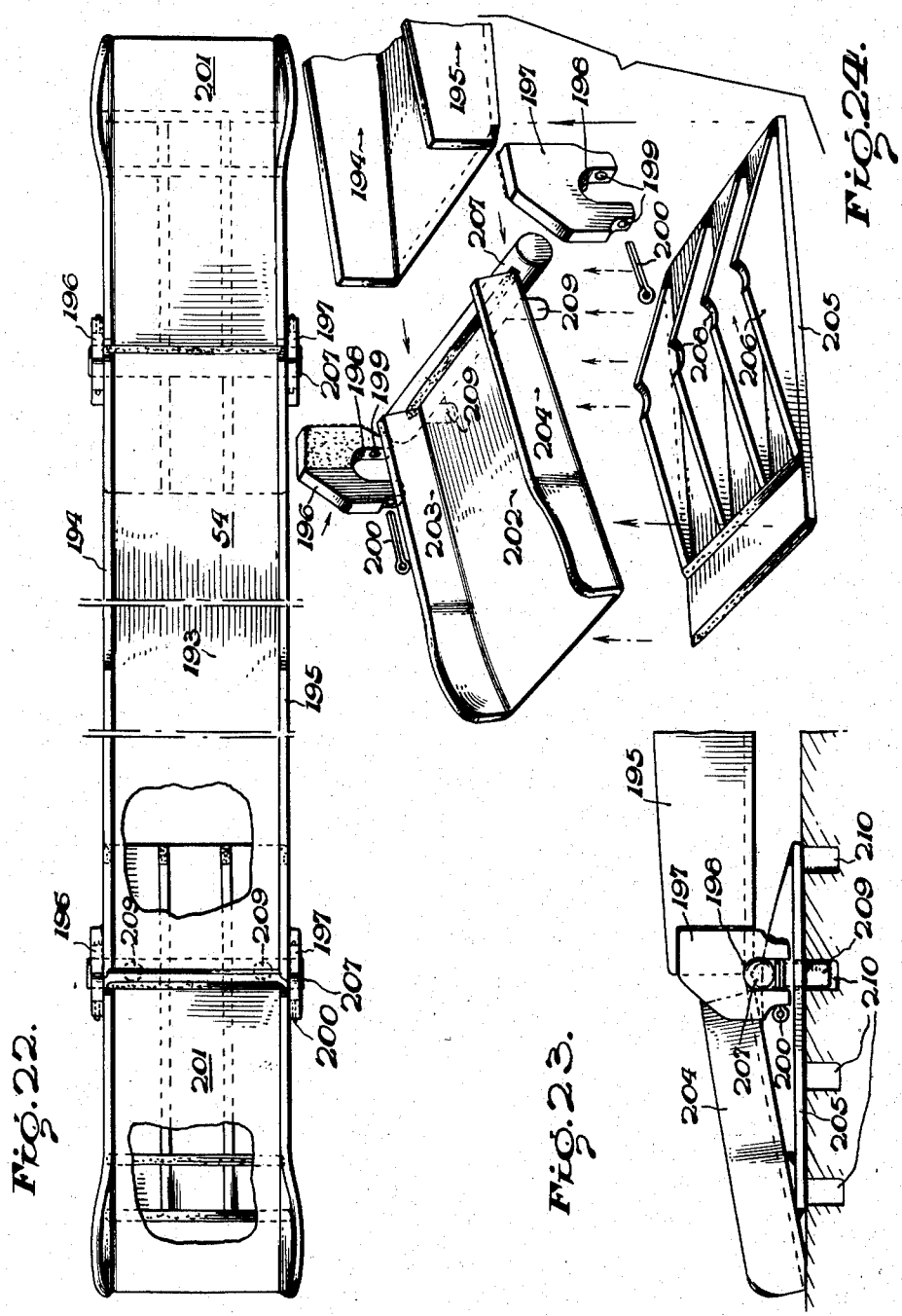

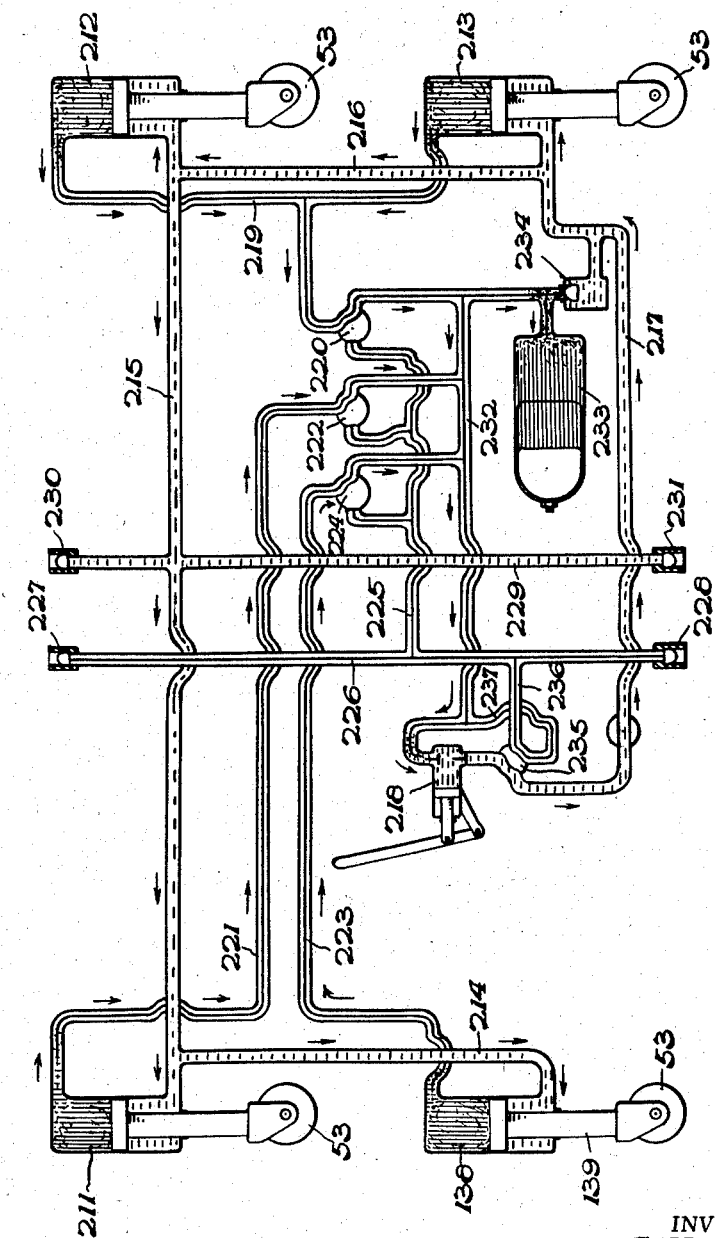

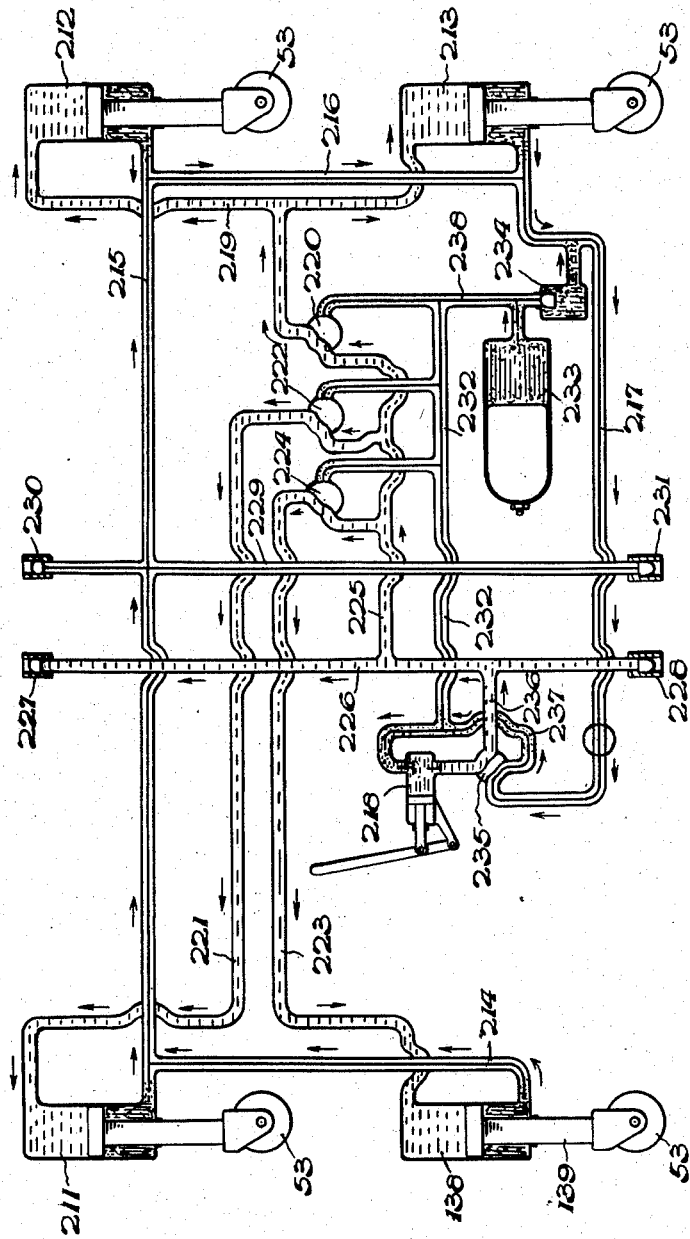

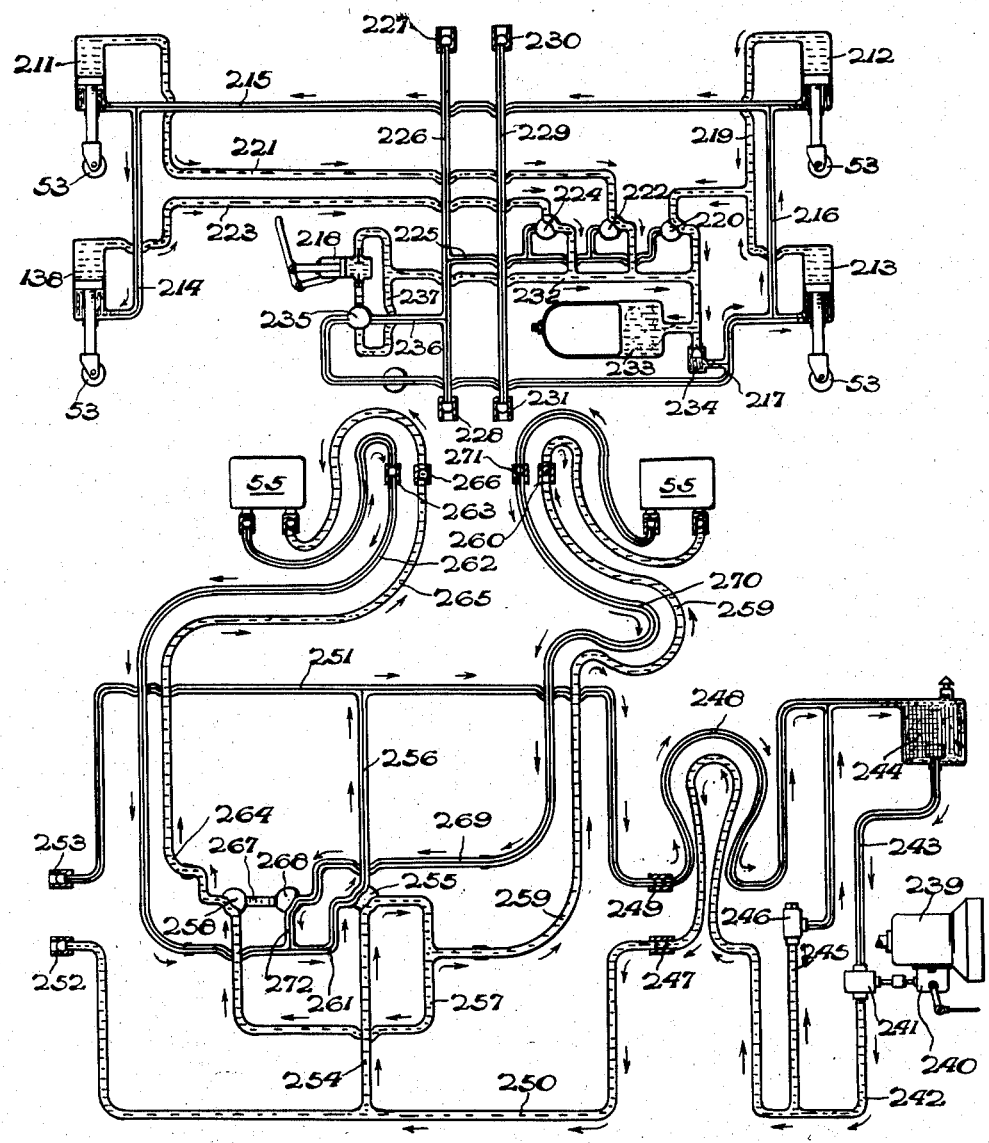

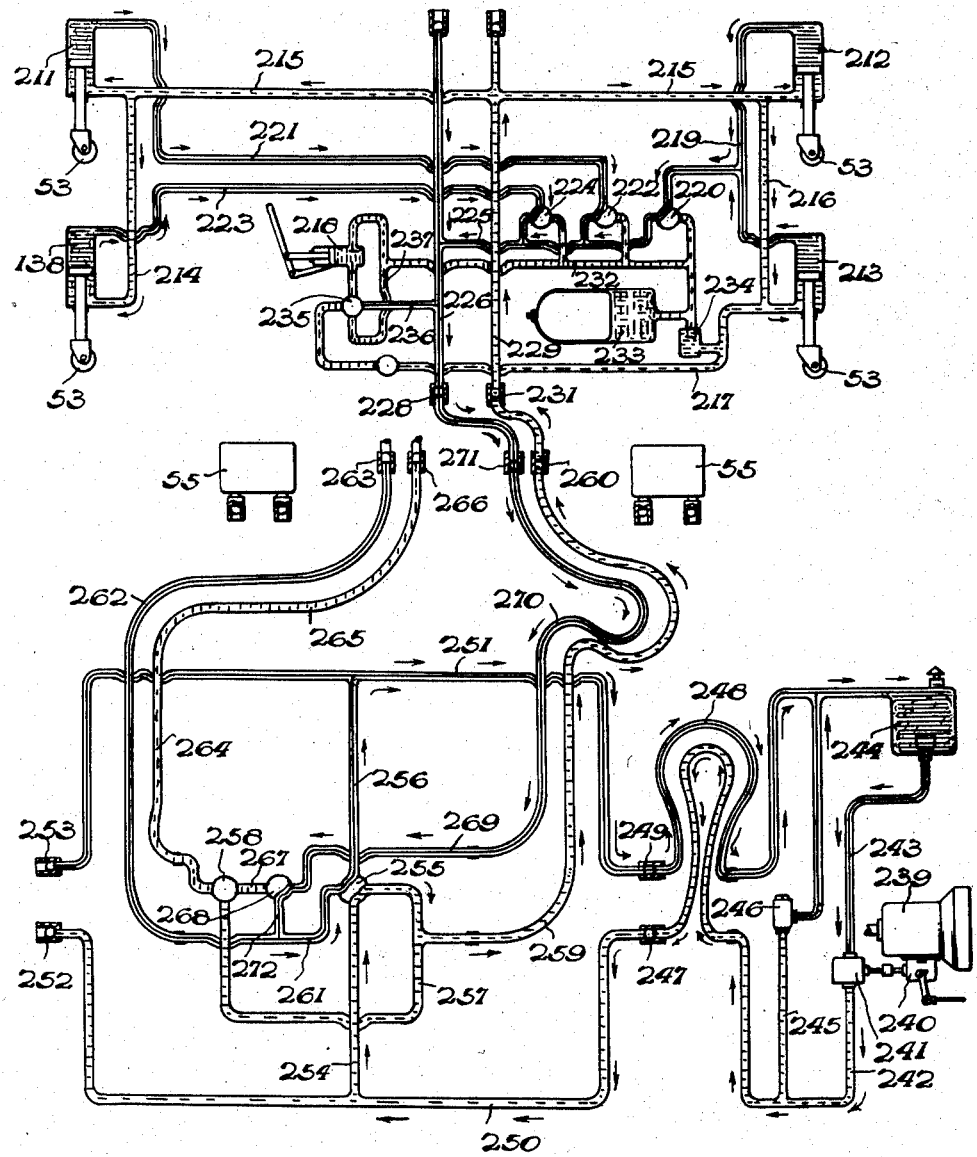

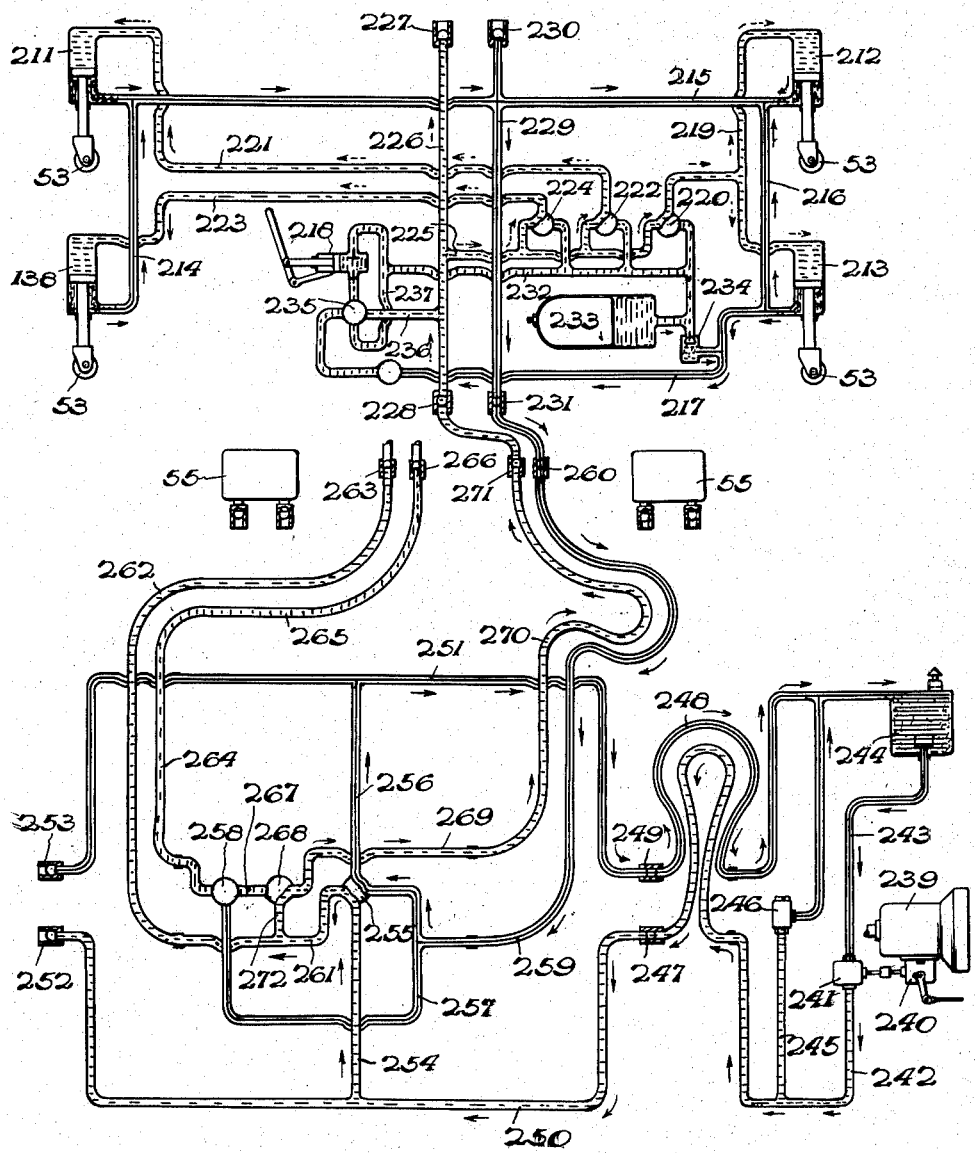

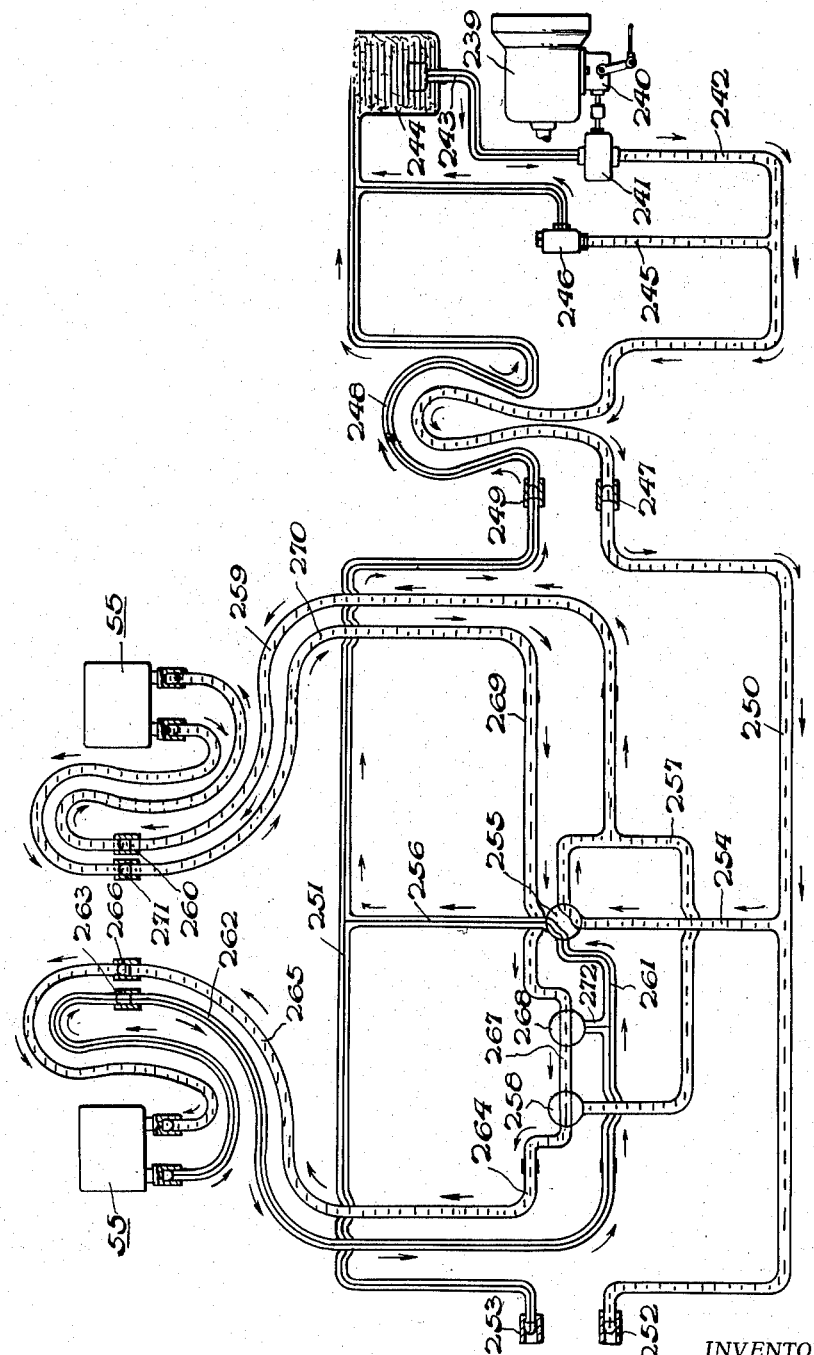

United States Patent Office 2,873,502
Patented Feb. 17, 1959

2,873,502

SYSTEM AND APPARATUS FOR HANDLING TRANSPORTABLE CONTAINERS

William C. Hodges and Alexander L. Robb, Redwood City, Calif., assignors to Hodges Research and Development Company, Redwood City, Calif., a corporation of California Application October 31, 1949, Serial No. 124,592

2 Claims. (Cl. 214—516)

This invention relates to a system and apparatus for handling transportable containers and more particularly to such a system and apparatus in which less than carload lot sized containers are transferred from and to various types of transporting means or transferred from or to loading docks and the like from or to various types of transporting means.

Heretofore many systems and devices have been proposed for shifting less than carload lot sized containers between various means of transportation or to or from loading docks and the like from or to various transporting means. These known systems and devices are subject to various objections, including unnecessarily complicated and expensive apparatus for effecting the transfer of the containers and for these reasons such systems and apparatus have not been accepted commercially. These known systems and apparatus require such massive and cumbersome machinery for effecting the transfer of the container that the transporting equipment with which such mechanism is associated is thereafter unsuited for any use but the transportation of specially designed less than carload lot containers and these containers can be handled only with such equipment and cannot be utilized as separate mobile units.

By the present invention we have overcome all of the inherent difficulties in these known structures and systems and have further provided a novel system and apparatus for the transfer of less than carload lot containers which is of such a simple yet powreful construction that the apparatus does not in any way preclude the use of the transporting equipment for other purposes than the transportation of the less than carload lot sized containers used with our invention. These containers may be moved and handled by other means than the transfer means herein disclosed and provide separate mobile units for complete transportation of loads from point of origin to point of ultimate disposition.

We have overcome the difficulties inherent in known systems and apparatus by providing the less than carload lot containers with power actuated reciprocal casters at each corner of the container so that the container may be readily raised by extension of the casters into position for rolling on the same or readily lowered from such raised position so that the container will rest on its bottom and the casters may be retracted above the bottom of the container. In conjunction with the casters we have provided power means running on tracks set into the bed of the container transporting means and preferably powered from the engine of the transporting means to move the container upon its casters onto and off of the transporting means. When the container is to be moved from one transporting means to another or from the transporting means to a loading dock or the like we employ bridging elements to bridge the space between the transporting means or the transporting means and the loading dock over differences of elevation thereof to provide a track for the casters and to support the container in transfer. Our system and apparatus are so constructed and arranged that the several elements thereof are readily transportable and may be used and positioned by the driver of the transporting means without assistance so that it is possible for one man to effect and control the transfer of containers of large size without danger either to the operator or to the container and its contents. By providing the container with castering support at each corner it is possible to readily move the container from one position to another and we provide means for controlling the position of the casters so that the container may be readily towed or pushed into any desired position thus making it possible to effect load transportation from point of origin to point of ultimate disposition without shifting of the load from the container.

It is accordingly an object of the present inventon to provide a novel system and apparatus for effecting the transfer of less than carload lot containers.

Another object is to provide such a system and apparatus in which power means mounted upon tracks in the bed of the transporting means are employed for moving the container onto or off of the transporting means.

Another object is to provide such a system and apparatus in which the container may be mechanically raised and lowered onto and off of supporting casters to facilitate transfer of the same and to provide a completely mobile container for use as individual units.

Another object is to provide such a system and apparatus in which the power for effecting the transfer of the container is preferably obtained from the driving power of the container transporting means although such power may be obtained from any other suitable source.

Another object is to provide such a system and apparatus which does not require major rebuilding of known types of transporting means for utilization with our less than carload lot containers and which does not preclude the use of the transporting means for other purposes than with our less than carload lot containers.

Another object is to provide such a system and apparatus which is relatively simple and inexpensive to install on existing types of transporting means and which may be used by unskilled personnel with minimum training and experience.

Another object is to provide such apparatus in which novel power means are mounted on tracks in the bed of the transporting means for connection to the container for transferring the same onto and off of the transporting means.

Another object is to provide novel means for raising and lowering the casters arranged at each corner of the container.

Another object is to provide a novel construction for locking the casters in any desired castered position to facilitate transportation of our containers on their casters in any desired direction.

Another object is to provide novel braking mechanisms for our casters.

Another and still further object is to provide novel bridging means for bridging the variable space between the transporting means and another transporting means or a dock or the like which bridging means support the casters during transfer of the container and compensates for differences of elevation.

Another object is to provide novel means for extending the tracks supporting the power means outwardly beyond the edges of the transporting means.

Another object is to provide a novel system for controlling the raising and lowering of the casters so that the casters on one end of the container may be controlled in unison and the casters on the other end may be controlled in unison for equal load distribution.

Another object is to provide a novel system for utilizing the power of the transporting means to power the power means employed for moving the container.

Another object is to provide such a novel system and apparatus with which transfer of the container may be accomplished from either side of the transporting means and in either direction therefrom.

Another object is to provide such a novel system and apparatus which can be readily installed on known types of transporting means without major modification thereof and without so changing the same as to preclude its use for other purposes.

Another object is to provide such a novel system and apparatus which will permit transfer of the container either laterally of the transporting means or longitudinally thereof.

Another object is to provide such a system and apparatus in which transfer of the container is quickly and efficiently accomplished.

Another object is to provide a novel less than car load lot container for use in our system and with our apparatus which is in itself a mobile self contained unit.

Another object is to provide novel connecting means between the powered means and the container which may be extended in length when desired to give additional reach to the powered means.

Other and further objects of the present invention will appear from the following descriptions.

Our invention is capable of various mechanical embodiments, one of which is shown in the accompanying drawings and is described hereinafter for purposes of illustration. It should be understood therefore that this illustrative embodiment of our invention in no way defines or limits the same and reference should be had to the appended claims for this purpose. While hydraulic systems are employed in this illustrative embodiment of our invention and specific mechanical means are also described other than hydraulic systems and modifications of the described mechanical means may be employed within the scope of our invention.

Referring now to the several drawings, in which like reference characters indicate like parts, Fig. 1 is a somewhat schematic representation of a truck equipped with our system and apparatus for transferring a transportable van or container to a railroad flatcar at higher elevation than the bed of the truck and showing the several elements of the present invention in position for commencing such a transfer;

Fig. 3 is a further showing of the embodiment of Fig. 1 in which the transfer of the van is almost completed from the truck to the flatcar;

Fig. 4 is a further showing of the embodiment of Fig. 1 in which the transfer of the van from the truck to the flatcar has been completed;

Fig. 7 is a further showing of the transfer illustrated in Fig. 5 in which the container has progressed further in its transfer from truck to flatcar;

Fig. 8 is a showing of the transfer of Fig. 5 in which the container has completed its movement from the truck to the flatcar;

Fig. 9 is a view from above of a truck carrying a transferable container in position alongside a railroad flatcar with the several elements of our invention in a position for commencing the transfer from truck to the flatcar;

Fig. 9a is a view from above in somewhat schematic arrangement showing the supporting surface of a means of transportation arranged for either transverse or end transfer of our containers;

Fig. 10 is a side view of a tuck with the transferable container of our invention mounted thereon with the several elements of the present invention shown somewhat schematically in position for starting the transfer of the container;

Fig. 10a is a somewhat schematic side view showing our invention when used in end transfer of our containers from a means of transportation to another means of transportation, loading dock or the like;

Fig. 11 is a side view of the power mechanism which we employ for transferring the container and showing the transfer mechanism mounted upon its track let into the bed of the truck;

Fig. 11a is a cross-section view of the embodiment of Fig. 11 on line 11a—11a thereof;

Fig. 12 is a view of the mechanism of Fig. 11 as seen from the right in Fig. 11;

Fig. 13 is a view from above of a part of the power mechanism of Fig. 11 to illustrate a part of the gear train thereof;

Fig. 14 is an end view with enlarged detail of the hook illustrated in Fig. 11 and with an extension latch also shown therein;

Fig. 15 is an enlarged detail as seen from above of a section of the track upon which the transfer mechanism operates;

Fig. 16 is a side view of a portion of the transferable container of our invention to illustrate in detail the structure of the mechanism for raising and lowering the casters;

Fig. 17 is an end view of the section of the container shown in Fig. 16 to further illustrate the mechanism employed for raising and lowering the casters and to show the construction of the door hinges of the container;

Fig. 18 shows a mechanical means for mounting the rail extension to the sides of the truck and shows the latching mechanism therefor in unlatched position;

Fig. 18a is a showing of the mechanism of Fig. 18 with the rail extension in latched position;

Fig. 19 is an elevation partly in section of our novel mechanism for providing castering action for the casters which we employ at each corner of the container and shows the novel locking mechanism for locking the casters in various positions as well as our novel mechanism for braking the casters;

Fig. 19a is a view of the mechanism of Fig. 19 as seen from the left therein;

Fig. 20 is an enlarged detail of the latching mechanism of Figs. 19 and 19a;

Fig. 21 is a cross-sectional view of the mechanism of Fig. 19 on line 21—21 thereof;

Fig. 22 is a view from above of the novel bridging structure which we employ to bridge the gap between the truck and flatcar during transfer of the container to receive the casters of the container;

Fig. 23 is a side view of a portion of Fig. 22 showing in detail the shoe structure for supporting the ends of the bridging structure;

Fig. 24 is an exploded view of the portion of Fig. 22 shown in Fig. 23 to illustrate how the shoe is assembled with the bridging structure;

Fig. 25 is a schematic representation of a suitable hydraulic system incorporated in our transferable container showing this hydraulic system in position for raising the casters above the level of the floor of the container by manual means;

Fig. 26 is a schematic view of the hydraulic system of Fig. 25 showing this system in position for lowering the casters by manual means for elevating the container to place the weight thereof on the several casters;

Fig. 27 is a further showing of the hydraulic system of Fig. 25 to illustrate the operation of the accumulator when the container is lowered to rest upon its bottom without bleeding the hydraulic system;

Fig. 28 is a schematic showing of the entire hydraulic system employed with our invention showing the hydraulic system incorporated with the truck and the hydraulic system of the transferable container, both systems being connected to apply hydraulic power to the casters to raise them above the level of the bottom of the container;

Fig. 29 is a further showing of the systems of Fig. 28 in which the systems are connected to apply hydraulic power to the casters to raise the container and place its weight upon the several casters;

Fig. 30 is a schematic representation of the hydraulic system of the truck connected to the power transfer means for actuating these means in parallel during the transfer of the container; and Fig. 31 is a schematic representation of the hydraulic system of the truck connected to the power transfer means for actuating these means in series during transfer of the container.

Figure 1:
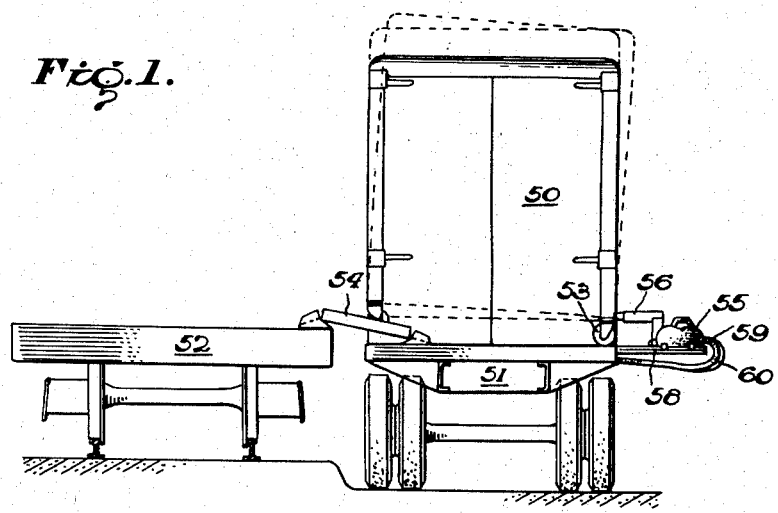

Referring now to the several figures, and more particularly to Figs. 1 through 10, it is there seen that our invention generally comprises, in this illustrative embodiment, a system and apparatus for transferring a transportable container generally indicated at 50, to or from a truck or other suitable transporting means generally indicated at 51, transfer being effected either to or from any other suitable type of transporting means here shown as a conventional railroad flatcar generally indicated at 52. The transferable container 50 is mounted upon castering wheels 53, one at each corner thereof, and these wheels during transfer cross bridging elements 54, bridging the space between the truck and the flatcar. Transferable containers 50 are moved upon casters 53 in transfer by means of one or more power transfer means 55 which are coupled thereto by extensible coupling 56. Power transfer means 55 are mounted upon rails 57 let transversely into the bed of the truck 51 and flush therewith. Rails 57 are provided with extensions 58 for purposes which will more fully appear hereinafter.

As noted above, the system of this illustrative embodiment of our invention for raising and lowering the transferable container 50 and for energizing the power transfer mechanisms 55 is hydraulic and this hydraulic power is applied to power transfer means 55 through hoses generally indicated in these figures at 59 and 60. It should be noted that the several elements of our apparatus such as the bridging rails 54, the power transfer means 55, the rail extension 58 and the other elements to be described hereinafter are so constructed and arranged that they may be readily lifted and placed in position by the driver of the truck without further assistance so that the entire transfer of container 50 may be effected by the driver of the truck without assistance and without employing any other mechanisms and devices than those described in detail herein.

Assume that container 50 is resting upon its bottom on truck 51 and that it is desired to transfer the same from truck 51 to flatcar 52. The driver of truck 51 brings the same into proximity with flatcar 52 and as nearly parallel thereto as practical. It should be understood that it is not essential to the operation of our invention that truck 51 be parallel to flatcar 52 and at the same elevation as flatcar 52 since bridging elements 54 can compensate for differences both in parallelism and in elevation, and power transfer means 55 are powerful enough to overcome differences in elevation above or below the truck level of at least 12 inches with container 50 fully loaded. Having brought the truck 51 into proximity with flatcar 52, the driver then places rail extensions 58 in position on the side of the truck away from flatcar 52 to provide continuations of rails 57 beyond the side of the truck. Power transfer mechanisms 55 are then mounted upon rail extensions 58 and connections 56 are secured to the side of container 50 away from the flatcar 52. The hydraulic system of the present invention is then energized to raise casters 53 above the floor level of the container, as will more fully appear hereinafter, so that bridging rails 54 may be placed in position under the casters adjacent to flatcar 52 to bridge the space between flatcar 52 and truck 51. The hydraulic system is then energized to lower the casters 53 to raise the container off of its bottom and to place the weight thereof upon the several casters 53.

Figure 2:
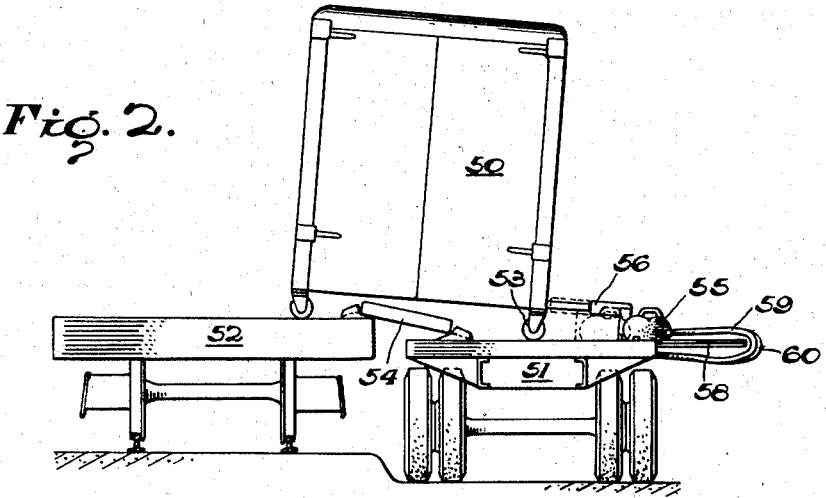
Fig. 2 is another view of the illustrative embodiment of Fig. 1 showing the van partially transferred onto the railroad flatcar and the position of the several elements of the present invention when transfer has been partially completed.
Figure 5:
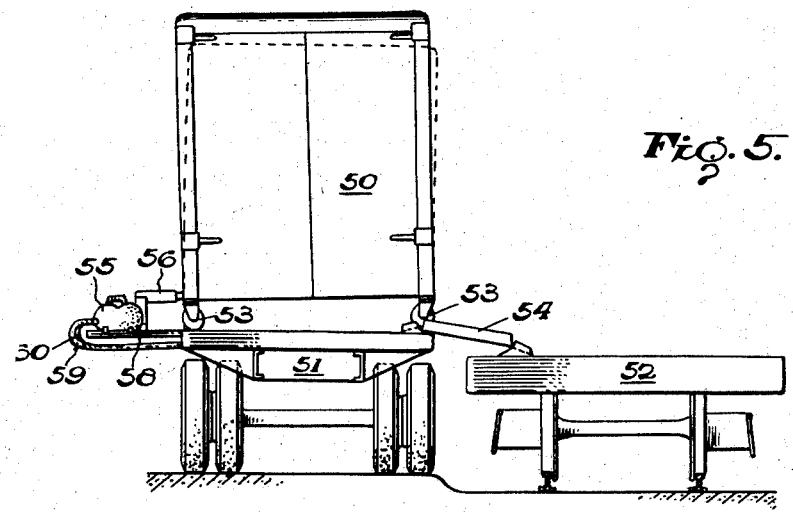
Fig. 5 is a showing of the system and apparatus of the present invention in accordance with the embodiment of Fig. 1 in which the van is to be transferred from a truck to a railroad flatcar at lower elevation than the truck and showing the positioning of the several elements of our invention at the commencement of the transfer.
Figure 6:
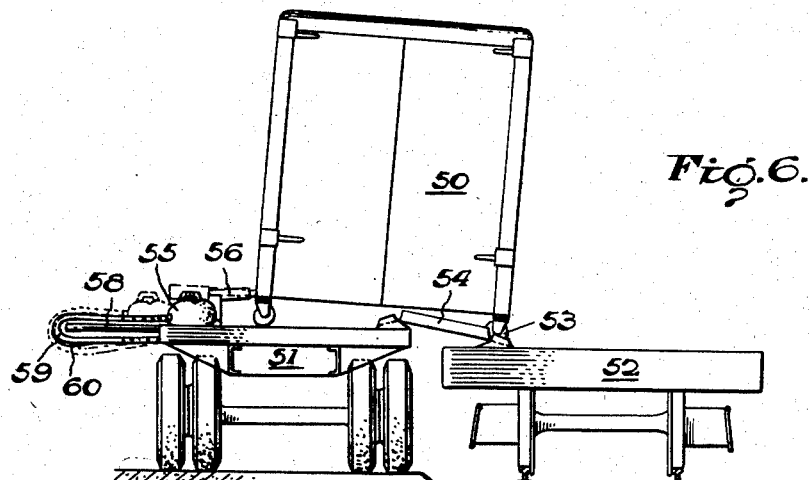
Fig. 6 is a further showing of the transfer illustrated in Fig. 5 in which the van is partially transferred from the truck to the flatcar.

The hydraulic system is then connected to the power transfer mechanisms 55, hoses 59 and 60 being shown for this purpose. Hydraulic power is then supplied to mechanisms 55 and energizes the same and drives them along rail extensions 58, pushing container 50 towards flatcar 52. This movement is continued until the several elements reach the general positions shown in Fig. 2 at which time the hydraulic power supplied to mechanisms 55 may be stopped and the motion of mechanisms 55 reversed to extend coupling 56 when necessary as shown in Fig. 2, as will be described in more detail hereinafter. Coupling 56 is elongated at this time so that container 50 may be transferred completely onto flatcar 52 without the use of rail extensions for rails 57 at the side of the truck adjacent the flatcar. After couplings 56 have been extended, power mechanisms 55 are further energized hydraulically to complete the transfer of the container from the truck to the flatcar in a smooth and continuous movement, the casters riding over bridging elements 54. The completion of this transfer is shown in Figs. 3 and 4. The use of the elongation of the coupling is necessary only when it is desired to push or pull the van to or from flat cars or platforms or the like farther than is normally required. (In the majority of cases it will not be necessary to use this extensible feature of arm 56.)

When container 50 has been positioned upon the flatcar 52, the hydraulic system is suitably adjusted to raise the casters 53 to lower the container upon its bottom on the flatcar. The transfer is now completed and the driver of the truck then disconnects the couplings 56 from the container and reverses the motion of mechanisms 55 to bring them back onto rail extensions 58, whereupon he disconnects hoses 59 and 60 from them, and removes the mechanisms from the rail extensions and places them in any suitable compartment provided on the truck chassis. Rail extensions 58 are removed and bridging elements 54 are also removed and placed in a suitable carrying compartment or rack upon the truck. The truck is then ready to be used for any other purpose or to pick up another transferable container.

When the transfer is to be effected from the flatcar to the trailer, and the transferable container 50 is upon the flatcar 52, the truck 51 is positioned adjacent to flatcar 52 and rail extensions 58 are placed in position. Power mechanisms 55 are then mounted on extensions 58 and hoses 59 and 60 are connected. Hydraulic power is then applied to mechanisms 55 to move them across the bed of trailer 51 with couplings 56 extended if necessary and couplings 56 are secured to the side of the container. The casters 53 of container 50 are raised, if necessary, to allow bridging elements 54 to be put into position to bridge the space between trailer 51 and flatcar 52. Hydraulic power is then applied to the casters 53 of container 50 to raise container 50 off of its bottom so that the weight of the container is supported upon the casters 53. Hydraulic power is then applied to transfer mechanisms 55 to roll container 50 upon its casters 53 off of the flatcar 52 and across the bridging elements 54 onto trailer 51. As soon as container 50 has moved completely onto truck 51, the hydraulic system is actuated to stop transfer mechanisms 55 and then to retract casters 53 so that container 50 rests upon its bottom on truck 51. The several elements are then disconnected as above described, and placed in suitable containers carried by truck 51 and truck 51 is then ready to drive away with the container, it being obvious, that suitable means may be employed to secure the container 50 to the truck 51, or for that matter, to flatcar 52 and that these ties must be secured or broken as the case may be at the beginning and end of each transfer.

Figs. 5 through 8 show the several steps, as above described, for transferring a container 50 from a truck 51 which is at a higher elevation than the flatcar 52. The procedure is exactly the same as that described above when the truck is lower than the flatcar and it should be noted that because power transfer mechanisms 55 are mounted upon tracks 57 and are actuated by a hydraulic system, it is impossible for these mechanisms to run away and it is therefore possible to control the movement of the container 50 without danger of the same getting out of control. It should further be noted that the several power transfer mechanisms 55 may be individually controlled so that the direction of motion of container 50 in transfer may also be controlled to the end that the same may be nicely positioned upon either the flatcar or the truck as the case may be.

Figs. 9a and 10a show an arrangement of tracks 57 on truck 51 and the placement of bridging elements 54 for effecting end transfer of the container 50 as distinguished from side transfer as above described. In Fig. 9a tracks 57 are let into the truck 51 laterally for side transfer and another track 57 is let into the truck 51 lengthwise thereof. If end transfer is to be accomplished the truck 51 is backed or otherwise suitably positioned so that its rear is adjacent the end of car 52 or any other surface suitable to receive the container 50. Bridging elements 54 are then positioned to bridge the space between truck 51 and car 52 and power units 55 are mounted on the lengthwise track 57 and are connected to the adjacent end of container 50. The transfer of container 50 is then accomplished as described above except that it takes place over the end of truck 51 instead of a side thereof. Obviously more than one longitudinal track 57 may be used and if one such track is available more than one power unit 55 may be mounted thereon and coupled together to obtain the power required to transfer the container.

Referring now to Figs. 11, 11a and 12, it is there seen that tracks 57 and track extensions 58 are made up of a pair of U-shaped channel members 61 and 62 spaced by the spacer bar 63 and secured together by a plurality of screws 64 or by any other suitable means passing through the channel members 61 and 62 and through spacer bar 63. The channel members 61 and 62 are so arranged that they are secured in back-to-back relationship with respect to spacer 63. Channel members 61 and 62 are provided with a plurality of spaced, oppositely disposed holes 65 adjacent their upper edges to receive the shafts of rollers 66. Rollers 66 are suitably spaced apart to receive the teeth of the driving sprocket of the power transfer mechanism 55 as will appear in more detail hereinafter. The track made up by channel members 61, 62, spacer 63 and rollers 66 is secured in the bed of the truck and may be supported by any suitable metallic channel 67.

Rail extensions 58 may be secured to rails 57 by any suitable means. In Fig. 11 this means includes a hook 68 secured in rail extensions 58 which enters rail 57 where it is engaged by any suitable latching mechanism 69 carried by rail 57. Latching mechanism 69 includes a vertically movable latch 70 to engage hook 68 and a second vertically movable latch 71 to engage L-shaped piece 72 secured to the rail extension 58 by gusset 73. A suitable operating lever 74 may be provided to actuate latches 70 and 71 to lock rail extensions 58 in place. Other means may be employed to lock rail extensions 58 in place, and a suitable alternative mechanism is shown in Figs. 18 and 18a and will be described hereinafter with respect thereto.

Referring again to Figs. 11, 11a and 12, a chassis for a power transfer mechanism 55 is there seen to comprise a pair of side plates 75 and 76 suitably connected and spaced by the bed plate 77 to which they are suitably secured as by welding. A plurality of suitable rollers 78 are mounted on the inner side of side plates 75 and 76 for rolling engagement within channel members 61 and 62 so that this chassis is free to roll along tracks 57 and extensions 58. Side plate 75 is provided with an upwardly extending portion 79 and side plate 76 has a similar upstanding portion 80 to receive a cross pin 81. Extensible coupling 56 is pivotably mounted on pin 81 by a pair of gussets 82 and 83 which are secured to coupling 56 by any suitable means as by welding. Gussets 82 and 83 are of reduced dimensions at their extremities away from coupling 56, and are spaced apart by spacer 84, through which pin 81 passes. The pivot thus formed allows coupling 56 to rotate through a limited arc about pin 81 to allow for the differences of elevation taken by container 50 during transfer.

Coupling 56 is preferably formed as a hollow cylinder in which a cylindrical extension or arm 85 is free to reciprocate. Arm 85 terminates in a suitable hook 86 which provides a means for connecting with the container 50 for moving the same, and terminates at its opposite end in a collar 85a which is slidable within tube 56, the container 50 being provided with horizontal pins or other suitable means for engaging hook 86. Extension 85 is secured in a retracted position by latch 87 and is secured in an extended position by latch 88. Latches 87 and 88 are of identical construction except for right and left hand angular cam surfaces and are shown in detail in Fig. 14. As there shown, the latches comprise a cross member 89 pivoted at 90 to an extension 91 suitably secured to one side of coupling 56. Cross member 89 has a downwardly turned ear 92 and a spring 93 is mounted between ear 92 and member 56 to urge cross member 89 into latching position. An L-shaped lever 94 is pivoted on the other end of cross member 89 as at 95 and when rotated in one position prevents cross member 89 from falling into slot 96 cut through the top of coupling 56 and registering with the edge of collar 85a to automatically lock arm 85 and cylinder 56 together. Extension 85 slides freely within coupling 56 so that the same may be extended or retracted and by suitably arranging latches 87 and 88, member 85 will be automatically secured in either extended or retracted position.

Power transfer mechanisms 55 are mounted on the chassis running on tracks 57 by forming the housing of the same with extensions 98 which slip under spacers 84 and by boring the housings transversely as at 99 to receive pins 100 which pins pass through ears 101 correspondingly bored and mounted on top plates 77.

A power transfer mechanism 55 is shown in detail in Figs. 11, 12 and 13 and as there shown comprises a pair of spaced parallel side housings 102 and 103 spaced apart by spacers 104 through which suitable bolts 105 are passed. Any suitable hydraulic motor 106 is secured to housing 102 and the motor shaft of this motor terminates in a drive gear, neither shaft nor gear being shown since the structure is entirely conventional. This small motor drive gear meshes with a large gear mounted in gear housing 107 upon a shaft 108. A small driving gear, which is not shown, is mounted on shaft 108 in gear housing 109 secured on the outside of housing 103. A large gear, not shown, is mounted in housing 109 and meshes with the last-named gear and is mounted upon shaft 110. A small gear, which is not shown, is mounted upon the opposite end of shaft 110 and meshes with large gear 111 which is mounted upon shaft 112. A suitable driving sprocket 113 is secured to gear 111 and extends below housings 102 and 103 and through a suitable slot cut into top plate 77 so that sprocket 113 can engage the rollers 66. The gear train thus provided has any suitable gear reduction ratio, depending upon the power and speed of the hydraulic motor 106 and it is obvious that the arrangement of these gears may be altered within the scope of our invention to provide any desired speed of rotation of sprocket 113. It should be noted that the housing for power transfer mechanism 55 should be sufficiently cut away on its forward end, as at 114, to allow the desired degree of rotation of connector 56 about pivot 81. The hydraulic hoses 59 and 60 connect to motor 106 at 115 and 116.

When pin 100 is removed, power mechanism 55 may be easily removed from the chassis so that the weight of the power transfer mechanism 55 including the chassis and coupling 56 may be such that it may be readily handled by one man.

Motor 106 is any suitable commercially available hydraulic motor of reversible type so that its direction of rotation may be reversed by merely reversing the direction of flow of hydraulic fluid. The direction of rotation of sprocket 113 is therefore easily controlled and the motion of the chassis on track 57 may be controlled in either direction by control of the hydraulic fluid supplied to motor 106.

Figs. 18 and 18a show another method for securing the track extensions 58 to tracks 57 when it is desired to have the track extensions integral with the track. In this embodiment, the spacer blocks 63 are cut away at the outer end of tracks 57 to accommodate a latch 118 which occupies the space between channels 61 and 62 of the track extensions. Extensions 58 are supported by gussets 119 secured to the under side thereof and gussets 119 have inturned ends 120 secured thereto or formed integrally therewith to which is secured a block 121 which is pivotally mounted upon a pin 122 which is suitably secured to the framework of the truck. Track extension 58 is therefore rotatable about pivot 122 and can be swung up into position to form an extension of track 57 or can be rotated in a clockwise direction as seen in Fig. 18a, into a position beneath the truck body when not in use. A second latch member 123 is mounted upon a pivot 124 secured to the truck frame and is designed to be rotated into and out of engagement with latch 118. A shaft 125 is suitably mounted upon the framework of the truck and is rotated by the handle 126. Actuating block 127 is secured to shaft 125 and the stop 128 is provided to prevent block 127 from passing the vertical position during clockwise rotation thereof. The length of block 127 is so chosen that when it is in vertical position it will raise latch 123 into engagement with latch 118. An arm 129 terminates in a hook at 130 to embrace a pin 131 mounted upon block 127 and engages a suitable spring 132 at its opposite end. Spring 132 is secured at 133 to the chassis of the truck. The tumbler block 134 is loosely mounted on shaft 125 and terminates at one end in a finger 135 which can engage a pin 136 mounted on the upper end of block 127. Tumbler 134 is provided with downwardly extending finger 137 which is engageable by the upper surface of extension 121.

Fig. 18 shows the relative position of the several parts of the locking mechanism as the track extension 58 is being swung upward into locked position to form an extension of track 57. In this position, block 121 is in engagement with finger 137 and tumbler 134 is in a more or less horizontal position with extension 135 thereof engaging pin 136 on block 127. As track extension 58 is rotated in a counter-clockwise direction, the upper end of block 121 bears against finger 137 and rotates tumbler 134 in a clockwise direction. Rotation of tumbler 134 in a clockwise direction rotates block 127 in a similar direction since finger 135 is bearing against pin 136. This rotation continues until the movement of pin 131 rotates rod 129 sufficiently so that spring 132 passes the center line of rod 129 at which time spring 132 will snap block 127 in a clockwise direction about shaft 125 into engagement with latch member 123 and will force latch member 123 upward into locking engagement with latch member 118. When it is desired to disengage latch member 123 from latch member 118, lever 126 is rotated in a counterclockwise direction to manually return the several elements of this structure to the position shown in Fig. 18.

Figs. 16 and 17 show in detail the structure employed for raising and lowering the casters 53. This mechanism comprises a cylinder 138 in which is mounted a double-acting piston, not shown, provided with a piston rod 139. Cylinder 138 is secured to container 50 by any suitable means here shown as by bracket 140 which is suitably secured to the container as by bolts 141. Ears 142 may also be suitably secured to container 50 to receive the upper end of cylinder 138, pin 143 being provided to secure the same. Hoses 144 and 145 connecting into the hydraulic system of the container, as will be described hereinafter in more detail, provide hydraulic fluid to cylinder 138 to move the piston therein. Brackets 146 and 147 are secured to container 50 by any suitable means as by bolts 148 and a cylindrical caster leg 149 is mounted for reciprocation therein. Leg 149 is pivotally connected to piston rod 139 at 150. A spline 151 is secured to leg 149 and is mounted in a suitable slot let into bracket 147 to prevent rotation of leg 149 during reciprocation. Caster 53 is mounted in the lower end of leg 149 as will be described in more detail hereinafter.

Brackets 140, 146 and 147 are provided with pivots 152 upon which hinges 153 are mounted. Hinges 153 are suitably secured to doors 154 of container 50. Since brackets 140, 146 and 147 are mounted at the corners of container 50, this hinge structure permits doors 154 to open the width of the container 50 and to rotate into open position in contact with the sides of the container, thus providing a large area of ingress or egress for the container.

A suitable structure for the caster mounting in the lower end of leg 149 and for locking the same in any desired position as well as for braking the caster is shown in Figs. 19, 19a, 20 and 21. As there shown, caster 53 is mounted upon a suitable axle 155 which is carried in forks 156 and 157. Forks 156 and 157 are secured to a circular base 158 which is provided with a plurality of radially recessed apertures 159 for reasons that will appear more fully hereinafter. A central conical shaft 160 is carried by base 158 and terminates in threaded portion 161 upon which are mounted locking nuts 162 to secure bearing 163 thereto. A cylindrical bearing member 164 is mounted within caster leg 149 and terminates in a circular radially extending shoulder 165 which abuts the bottom of leg 149. Member 164 is cut away at 166 and 167 to receive bearings 168 and 169 respectively, which cooperate with shaft 160. A pair of outwardly extending ears 170 and 171 are provided on member 164 and latch 172 is mounted therein on pivot 173. Latch 172 is designed to cooperate with apertures 159 and when engaged in apertures 159 locks casters 53 in position. A leaf spring 174 is mounted behind latch 172 to urge the same into engagement with apertures 159. Latch 171 is slotted at 175 and a trigger 176 is pivoted in slot 175 at 177. Latch 171 is crossbored at 178 and a pair of pins 179 and 180 are mounted in bore 178. Flat springs 181 and 182 are secured to the outer edges of latch 171 and are of such a length that when latch 171 is in disengaged position, these leaf springs will snap onto the shoulders 183 and 184, formed on ears 170 and 171, respectively. Thus, when latch member 172 is rotated in a clockwise direction as seen in Fig. 20, out of engagement with apertures 159, springs 181 and 182 will retain the same out of engagement with apertures 159 so that casters 53 can rotate freely. When it is desired to lock casters 53 in any given position, trigger 176 is rotated in a counterclockwise direction as seen in Fig. 19, and this forces pins 179 and 180 outwardly and pushes springs 181 and 182 off of shoulders 183 and 184, thus releasing latch 172 and spring 174 rotates the same into engagement with the proximate aperture 159.

Because of the weight of container 50, particularly when loaded, it may be desirable in many instances, to provide brakes for the casters 53 either to lock them against rotation or to brake their rotation. For this purpose, we secure outwardly extending resilient braking elements 185 and 186 to forks 157 and 156, respectively, and these elements are provided with serrated inner surfaces, as at 187, for engagement with the sides of casters 53. A bolt 188 passes through elements 185 and 186, clear of the caster wheel, and is secured to element 185 at 189. Bolt 188 is provided at its other end with threads 190 upon which a nut 191 is mounted. A suitable wrench 192 or lever is provided for rotating nut 191 upon said threads 190 to bring serrated surfaces 187 into engagement with caster wheels, thus providing a braking or locking action for the same.

Lever 176, latch 172 and brake lever 192 may be operated either manually or by foot. This increases the ease of operation because of the relatively low position of these members when the container is supported on the casters as when moved on platforms or plant floors, and the relatively high position of these elements when the container is being transferred between or resting upon transportation devices or platforms or the like.

A suitable structure for the bridging elements 54 which we employ for bridging the space between the truck and the flatcar over which the casters 53 travel during transfer of the container is shown in Figs. 22, 23 and 24. Referring to these figures, it is seen that this bridging element 54 comprises a main channel-shaped section of any suitable length, indicated at 193 and provided with upstanding edges 194 and 195 for strength and to guide casters 53 during motion across the bridging element. A pair of downwardly depending ears 196 and 197 are suitably secured at each end of the channel 193 and each of these ears is cut away as at 198 and the ears are bored at 199 to receive a cotter pin 200. Each end of the bridging elements 54 is provided with a shoe 201 which is rotatable with respect thereto through limited arcs to adjust for any differences in elevation between the truck and the flatcar. Each of these shoes 201 comprises a channel-shaped ramp element 202, having upstanding edges 203 and 204 to guide casters 53 during passage thereover. Each ramp 202 is mounted upon a base plate 205 which carries a plurality of upstanding triangular-shaped webs 206 to which ramps 202 are secured. A cylindrical shaft 207 is welded to the inner end of ramp 202 the end of which is shaped to receive it to form a radial continuation thereof and is also welded into semi-circular slots 208 cut into webs 206. Shaft 207 extends beyond the edges 203 and 204 of ramp 202 and when the bridging element is assembled pass through the cut-away sections 198 of ears 196 and 197. Cotter pins 200, passing through holes 199, secure the ramp assemblies to the channel section 193 in such a way that shafts 207 form radial extensions thereof. The angularity of webs 206 determines the degree of rotation of the shoes 201 with respect to the channel section of the bridging element but because of this construction a continuous rolling surface is provided for the caster wheels.

A pair of pins 209 extend downwardly beneath plate 205 at one end of the bridging element for free fitting engagement in a plurality of paired and spaced holes 210 let into the bed of the truck. When pins 209 are engaged in holes 210, the bridging elements 54 are prevented from slippage during transfer of the container 50, but are free to rotate as required to adjust for varying elevations of the flatcar and the truck as well as to adjust for limited lateral displacement. In operation it is preferred to have the end of the bridging element 54 resting upon the truck and toward the center of the truck because the weight of the loaded container will tend to depress the springs of the truck and better load distribution is obtained by so placing the bridging element. Because the distance and height differential between the flatcar and the truck will vary, the series of holes 210 are provided to obtain proper positioning of the bridging elements to clear at all times the edges of the truck or dock.

Figs. 25, 26 and 27 show schematically the hydraulic system incorporated with the transferable container 50. As noted above, this hydraulic system is designed to raise and lower the casters 53. This system may obtain hydraulic fluid under pressure, either from lines connected thereto from a source of hydraulic pressure driven by the truck motor, an independent source of power, or the container hydraulic system may be operated by a hand pump integral therewith. Heretofore the cylinders for actuating casters 53 have been designated by numeral 138. In the description of this hydraulic system, it will be necessary to identify each cylinder in turn and accordingly in these figures one cylinder is designated by this number and the other three cylinders are indicated by numerals 211, 212 and 213. The lower sides of cylinders 138 and 211 are cross manifolded by line 214. Line 214 is connected by line 215 with a cross manifolding line 216 connecting the lower sides of cylinders 212 and 213. Line 217 connects line 216 with one side of a suitable manually operable pump 218. The upper sides of cylinders 212 and 213 are cross manifolded by line 219 for reasons which appear more fully hereinafter, which is connected to a suitable manually operable valve 220. A line 221 leads from the upper end of cylinder 211 to a suitable manually operable valve 222. Line 223 leads from the upper end of cylinder 138 to a third suitable manually operable valve 224. One outlet of each of valves 220, 222 and 224 are connected by line 225 to a line 226 which extends across the container and is provided at its ends with suitable quick disconnecting valves 227 and 228 which close automatically upon uncoupling. A second line 229 extends across the container and terminates at each end in valves 230 and 231 which are similar to valves 227 and 228 and connects into line 215. The third side of each of valves 220, 222 and 224 are connected by line 232 to the intake side of pump 218. A suitable accumulator 233 is connected between line 232 and line 217 with a check and relief valve 234 interposed adjacent line 217. This relief valve 234 is set at a pressure exceeding the return pressure drop to reservoir 244. Accumulator 233 is preloaded to a pressure sufficient to balance a volume of fluid stored therein against valve 234 equivalent to the maximum differential volume of the cylinders. This differential volume will always be stored in accumulator 233. A suitable valve 235 is positioned in line 217 adjacent pump 218 and has a connection 236 with line 226 and a connection 237 with line 232.

When it is desired to raise the casters 53 above the level of the floor of the container 50 as when the bridging elements 54 are to be placed under the casters 53 at the beginning of transfer of the container and it is not desired to connect in the hydraulic pressure lines from the truck for this purpose, the valves 220, 222, 224 and 235 are suitably positioned by the operator as shown in Fig. 25 and pump 218 is manually actuated. Hydraulic fluid under pressure then flows from pump 218 through line 217 into cylinder 213 beneath its piston; passes through line 216 to the underside of the piston in cylinder 212; passes through line 215 into cylinder 211 beneath its piston; and passes through line 214 into cylinder 138 beneath its piston. Hydraulic fluid under pressure beneath the pistons in the several cylinders raises these pistons and therefore raises the casters 53. The hydraulic fluid present above the several pistons in the several cylinders passes back to pump 218 in the following way. The fluid above the pistons in cylinders 212 and 213 passes through line 219 and valve 220 to line 232 and into pump 218. The fluid above the piston in cylinder 138 passes through line 223 and valve 224 into line 232 and then to pump 218. The fluid above the piston in cylinder 211 passes through line 221 and valve 222 into line 232 and back to pump 218. Pump 218 is, of course, provided with suitable check valves, as is well known to the art, to control direction of the flow of fluid through the pump. Excess of fluid in the system due to the differential type cylinders employed enters the accumulator 233 in a way to be fully described below.

When it is desired to lower casters 53 to raise the container 50 and to place the weight of the same upon the casters and it is desired to use pump 218 for this purpose, the hydraulic system is adjusted as shown in Fig. 26. The four valves, 220, 222, 224 and 235, are shifted to the positions as shown and pump 218 is manually actuated. Hydraulic fluid under pressure then flows from pump 218 to valve 235 and line 236 into lines 226 and 225. Fluid under pressure passes from line 225 to valve 224, into line 223 and into the upper end of cylinder 138. Fluid under pressure in line 225 passes through valve 222 and line 221 into the upper end of cylinder 211. Fluid under pressure in line 225 passes through valve 220 to manifolding line 219 and into the upper ends of cylinders 212 and 213. Fluid under pressure in the upper ends of the several cylinders forces the pistons therein downwardly, carrying casters 53 therewith and the container 50 is raised upwardly. Since cylinders 212 and 213 are cross manifolded by line 219 supplied through valve 220 if either caster 53 is forced to take an unequal share of the weight of the container additional fluid pressure will flow to the other cylinder forcing the piston therein downwardly until pressures on both casters are equalized.

The hydraulic fluid beneath the several pistons passes back to the pump in the following manner. The fluid beneath the pistons in cylinders 138 and 211 enters line 214 and then passes into line 215. The fluid under the piston in cylinder 212 passes into line 215 and the return fluid in line 215 then passes into line 216 which connects through line 217 and valve 235 with line 237 and pump 218. The fluid beneath the piston in cylinder 213 passes into line 217 and then to the pump 218 through valve 235 and line 237. As noted above, the check valves provided with pump 218 control the flow of fluid through the pump and prevents reversal of the direction of flow. The accumulator 233 provides fluid as required to compensate for the differential cylinders employed.

When it is desired to lower the container so that it will rest upon its bottom and when it is not desired to bleed the hydraulic fluid from the hydraulic system of the container, the several valves of the container hydraulic system are positioned as shown in Fig. 27. With valves 220, 222, 224 and 235 positioned as there shown, the weight of the container acting upon the pistons in the several cylinders will force these pistons upwardly and will force the hydraulic fluid out of the several cylinders and, at the same time, hydraulic fluid will be drawn in at the bottoms of the cylinders. The hydraulic fluid above the pistons in cylinders 212 and 213 will be forced out into line 219, through valve 220 into line 238, through check valve 234 into line 217 to the underside of the piston in cylinder 213 and through line 216 to the underside of the piston in cylinder 212. The hydraulic fluid above the piston in cylinder 211 passes through line 221 and valve 222 into line 232 to check valve 234, line 217, line 216 and line 215 to the underside of the piston in cylinder 211. The hydraulic fluid above the piston in cylinder 138 passes through line 223 and valve 224 into line 232 and through check valve 234 to line 217, line 216, line 215 and line 214 to the underside of this piston. Because the several cylinders and pistons are of the differential type, that is, the volume above the piston in the cylinder is greater than the volume beneath the piston because of the volume of the piston rod, it is necessary to employ the accumulator 233. As the pistons move upwardly in their respective cylinders, fluid is forced out of the cylinders, as described, and passes through the hydraulic system to the underside of the pistons. More fluid will be forced out of the upper ends of the cylinders than can be accommodated beneath the pistons because of the volume occupied by the several piston rods and this excess of fluid will enter the accumulator 233 as soon as the pressure backing up behind the pistons exceeds the pressure for which the accumulator is loaded. Thus by utilizing an accumulator of appropriate volume and loaded to an appropriate pressure it is possible to lower the container to rest on its bottom from its elevated position without damage to the hydraulic system of the container and also to apply hydraulic fluid to the cylinders when required.

In the operation of the hydraulic system of the container, as above described, the pressure for actuating the several pistons was provided by the hand pump 218. It is anticipated that the more usual procedure will be to employ the hydraulic system incorporated with the truck or a suitable independent source to provide hydraulic fluid under pressure to actuate the several pistons to raise and lower the casters. A suitable hydraulic system for the truck is shown in Fig. 28 connected to the hydraulic system for the container with both systems arranged to raise the pistons in the cylinders on the container at the beginning of the transfer operation to permit the bridging rails to be inserted beneath the casters. In this figure a conventional internal combustion engine transmission is shown at 239 with a conventional power take off 240 driving a conventional pump 241. Pump 241 is provided with an outlet or pressure line 242 and a return line 243. A conventional reservoir for hydraulic fluid is connected to line 243 and is shown at 244. A by-pass from supply line 242 back to reservoir 244 is shown at 245 and is provided with a pressure relief valve 246 so that when the pressure in supply line 242 exceeds a predetermined value, valve 246 will open and by-pass the hydraulic fluid under pressure back to reservoir 244. Supply line 242 terminates in a quick connect coupling 247 of any suitable type. A return line 248 is connected to reservoir 244 and terminates in any suitable quick connect coupling 249. This hydraulic system may be incorporated with the tractor of a conventional tractor-trailer type of truck.

The hydraulic system about to be described may be incorporated with the trailer of the tractor-trailer type of truck noted above. The trailer is provided with a hydraulic fluid supply line 250 which is connected at 247 to the system of the tractor and is provided with a return line 251 which is connected at 249 to the return line 248 of the tractor system. Lines 250 and 251 both terminate at 252 and 253, respectively, in quick connect couplings so that other hydraulic systems may be connected to this system when desired, as when a tandem trailer rig is being used. Line 250 is connected by line 254 with reverse control valve 255. Line 256 connects valve 255 to line 251. Line 257 connects valve 255 to a second valve 258 and to flexible hose 259 which terminates in any suitable quick connect coupling 260. Line 261 connects valve 255 with a suitable flexible hose 262 which terminates in any suitable quick connect coupling 263. Valve 258 is connected by line 264 with any suitable flexible hose 265 which terminates in a quick connect coupling 266. Line 267 connects valve 258 to valve 268 and valve 268 is connected by line 269 with flexible hose 270 which terminates in quick connect coupling 271. Valve 268 is connected by line 272 with line 261.

When it is desired to supply hydraulic fluid under pressure to the hydraulic system of the container from the hydraulic system of the tractor and trailer couplings 260 and 271 are connected respectively to couplings 231 and 228 and valves 255, 258 and 268 are positioned as shown. Power take off 240 then actuates pump 241 which supplies hydraulic fluid under pressure to line 242 and through connection 247 to lines 250 and 254 to valve 255. From valve 255 the hydraulic fluid under pressure enters line 259 and through couplings 260 and 231 enters line 229 of the hydraulic system of the container. After the hydraulic fluid has been utilized in the hydraulic system of the container it is returned to line 226 of the container system and through couplings 228 and 271 to the hose 270 and line 269 to valve 268. From valve 268 the return fluid passes into line 261 and through valve 255 into line 256, thence into line 251 and through coupling 249 into the return line 248 of the tractor system and through reservoir 244 and line 243 to the return side of pump 241. Surplus hydraulic fluid stored in accumulator 233 will be discharged through the hydraulic system to the reservoir 244.

When it is desired to raise the casters of the container utilizing the hydraulic power supplied by the tractor-trailer hydraulic system valve 235 is closed and valves 220, 222 and 224 are positioned as shown in Fig. 28. The hydraulic fluid under pressure enters line 229 and passes to the under side of the pistons in the several cylinders through lines 215, 214, and 216. This raises the pistons in the several cylinders and thus raises the several casters. Hydraulic fluid above the pistons in the several cylinders passes into the return line 226 of the container system and thence to the pump, as described above. The fluid above the pistons in cylinders 212 and 213 passes into line 219 and thence through valve 220 into line 225 and into return line 226. The liquid above the pistons of cylinders 211 and 138 passes into lines 221 and 223 respectively and thence through valves 222 and 224 respectively into line 225 and into return line 226.

When it is desired to elevate the container so that its weight rests entirely upon the casters and to utilize the hydraulic system afforded by the tractor and trailer, the container hydraulic system and the tractor and trailer hydraulic systems are disposed as shown in Fig. 29. In this arrangement the tractor and trailer hydraulic systems are adjusted as above described so that hydraulic fluid under pressure leaving valve 255 enters line 261 and thence through line 272 to valve 268 and to line 269 into flexible hose 270. Since hose 270 is connected through couplings 271 and 228 with line 226 of the container hydraulic system line 226 becomes the pressure line. Fluid under pressure from line 226 passes into line 225 and through valve 224 into line 223 and into cylinder 138 above the piston therein. Hydraulic fluid under pressure in line 225 also passes through valve 222 and line 221 into cylinder 211 above the piston therein. Line 225 also supplies hydraulic fluid under pressure through valve 220 to line 219 which passes the hydraulic fluid into cylinders 212 and 213 above the pistons therein. Hydraulic fluid under pressure above the pistons of the several cylinders depresses the same and raises the container upon the several casters. The hydraulic fluid beneath the pistons in the several cylinders passes into the return line, now line 229. The fluid beneath the piston in cylinder 213 passes upward in line 216 into line 215 and thence into line 229. The hydraulic fluid beneath the piston in cylinder 212 passes through line 215 into line 229. The fluid beneath the piston in cylinder 138 passes through line 214 into line 215 and thence into line 229. The fluid beneath the piston in cylinder 211 passes directly into line 215 and thence into line 229. Return liquid in line 229 passes through couplings 231 and 260 into line 259 and thence through valve 255 into line 251 and is returned to pump 241 through coupling 249, line 248, reservoir 244 and line 243. Surplus oil in accumulator 233 will pass to reservoir 244 as described above.

When the container is raised upon its casters quick connect couplings 260 and 271 may be broken so that the hydraulic system of the tractor-trailer may be employed to drive the power mechanisms 55. In providing hydraulic fluid to the power mechanisms 55 for energizing the same it is desirable in some instances to connect the power mechanisms 55 in series for uniform movement and in other cases it is desirable to connect the power mechanisms 55 in parallel for independent control and slower operation. The hydraulic system of the tractor and trailer may be utilized for this purpose. Fig. 30 shows the same arranged to connect the power mechanisms 55 in parallel. The hydraulic system schematically shown in Fig. 31 discloses the arrangement of the hydraulic system on the tractor and trailer adjusted to connect the power mechanisms 55 in series.

Referring now to Fig. 30 it is there seen that fluid under pressure from pump 241 will pass through line 242 and coupling 247 into line 250 and thence through line 254 and through valve 255 into hose 259 and into one power mechanism 55. Hydraulic fluid is discharged from this power mechanism 55 through hose 270 into line 269 and thence through valve 268 and line 272 into line 261 and line 256 for return to line 251, to line 248, reservoir 244 and pump 241. The hydraulic fluid under pressure passing through valve 255 also passes into line 257 and thence through valve 258 into line 265 and into the other of the power mechanisms 55. The hydraulic fluid discharged from the second power mechanism 55 passes into line 262 and into line 261 and thence through valve 255 into line 251, line 248, and reservoir 244 to the return side of pump 241. Thus it will be seen that the power mechanisms 55 are connected in parallel.

If it is desired to reverse the direction of movement of power mechanisms 55 when connected in parallel, as in Fig. 30, valve 255 is reversed without changing the position of valves 258 and 268. The hydraulic fluid under pressure in line 254 is then directed into what was the return line system as above described while what was previously the pressure line system, as above described, becomes the return line system. By reversing valve 255 fluid under pressure is admitted to line 261 and thence through flexible hose 262 to one of the power mechanisms 255. Fluid under pressure is also admitted to line 272 and thence through valve 268 into line 269 and into the other power mechanism 55. Fluid discharged from the first of the power mechanisms 55 passes through line 265 and through valve 258 into line 257 and through valve 255 into line 256 for return to the pump 241. Fluid discharged from the other of the power mechanisms 55 passes through flexible conduit 259 and through valve 255 into line 256 for return through line 251 to pump 241. Thus the hydraulic system provided by the tractor and trailer permits rapid and easy reversal of movement of the power mechanisms 55 by merely shifting the position of valve 255. It is therefore obvious that the direction of movement of the container can be easily adjusted during transfer and power mechanisms 55 can be indefinitely controlled by adjustment of valves 258 and 268.

When it is desired to connect the power mechanisms 55 so that each such power mechanisms 55 obtains the full volume of hydraulic fluid from pump 241, it is necessary to connect the same in series and the adjustment of the hydraulic system of the tractor and trailer to provide this series connection is shown in Fig. 31. In this arrangement fluid under pressure passes from pump 241 through line 242 and coupling 247 into line 250 and thence into line 254 and valve 255. From valve 255 hydraulic fluid under pressure passes into hose 259 and thence into the first of the power mechanisms 55. Discharge fluid from the first power mechanism 55 passes through hose 270 and line 269 directly through valves 268 and 258 into hose 265 and thence into the second of the power mechanisms 55. The discharge from the second power mechanism 55 passes through hose 262 into line 261 and thence through valve 255 into line 256 and into line 251 for return to the pump 241, as described above.

Reversal of the direction of motion of the power mechanisms 55 is obtained by merely reversing the position of valve 255. When valve 255 is reversed fluid under pressure from line 254 enters line 261 and passes through hose 262 into the first of the power mechanisms 55. The fluid discharged from the first of the power mechanisms 55 passes outward through hose 265 and directly through valves 258 and 268 into line 269 and hose 270 and into the second of the power mechanisms 55. The discharge from the second power mechanism 55 passes through hose 259 into valve 255 and from valve 255 into line 256 for return to the pump 241 through lines 251 and 248. This hydraulic system thus provides a ready means for accurately and promptly controlling the direction of motion of the power mechanisms 55 when connected in series and thus provides a simple and direct control for the motion of the container in transfer.

It is now apparent that by the present invention we have provided a novel system and apparatus for transferring less than carload lot containers from one means of transportation to another or to or from one means of transportation to or from a dock or the like, which system and apparatus efficiently accomplishes all of the objectives described above.

It will now be apparent to those skilled in the art that changes in or modifications to the above described illustrative embodiment of our invention may now be made without departing from our inventive concept. For example the several valves of the hydraulic system may be any of the valves known to the art suitable for this purpose and having the appropriate number of valve ports. In some instances it may be necessary to modify or adjust such known valves to adapt them for our purposes or to provide such valves with bleed lines or other connections to make them operate as desired which is all within the skill of one skilled in this art. The hydraulic system may also be modified to eliminate the use of the accumulator by providing non-differential pistons and cylinders for the casters. It is also within the scope of our invention to modify the hydraulic systems of our apparatus to combine the several valves into a single valve, if desired, or to provide suitable controls for the several valves so that they may be controlled by the operator as desired by single means. It is also obvious that the structure of the casters, their swiveling mechanisms, and the rams for raising and lowering the casters may be modified within the scope of our invention. Reference should therefore be had to the appended claims to determine the scope of this invention.

What is claimed is:

1. In a transfer system as described in combination, a container, casters mounted at each corner of said container, hydraulic means for retracting said casters above and extending said casters below the floor of said container, transportation means for said container, means for circulating hydraulic fluid to and from said hydraulic means including means for controlling the movement of said casters, tracks mounted on said transportation means, hydraulically powered self-propelled means removably attached to said container and mounted on said tracks supplying power to transfer said container, means for circulating hydraulic fluid to and from said powered self-propelled means including means for controlling the speed and direction of movement of said powered means, a single source of hydraulic power for said hydraulic means and for said hydraulically powered self-propelled means and removable track extensions for extending said track beyond the edge of said transportation means upon which said powered means are mounted to initiate transfer of said container from said transportation means and to complete transfer of said container to said transportation means.

2. In a transfer system as described in combination, a container, casters mounted at each corner of said container, hydraulic means for retracting said casters above and extending said casters below the floor of said container, transportation means for said container, means for circulating hydraulic fluid to and from said hydraulic means permanently associated with said container including means for controlling the movement of said casters, tracks mounted on said transportation means, hydraulically powered portable self-propelled means removably attached to said container and mounted on said tracks supplying power to transfer said container, means permanently associated with said transportation means for circulating hydraulic fluid to and from said powered self-propelled means including means for controlling the speed and direction of movement of said powered self-propelled means, a source of hydraulic power for said second named circulating means, manual means for connecting said second named circulating means into said first named circulating means, and a manually actuated source of hydraulic pressure permanently associated with said container and selectively connected into said first named circulating means.

References Cited in the file of this patent

UNITED STATES PATENTS

| | | |
|---|---|---|
| 1,219,071 | Bodnar | Mar. 13, 1917 |
| 1,221,750 | Laird | Apr. 3, 1917 |
| 1,326,949 | Meehan | Jan. 6, 1920 |
| 1,407,253 | Castleman | Feb. 21, 1922 |
| 1,551,122 | Sheppard | Aug. 25, 1925 |
| 1,857,653 | Meyercord et al. | May 10, 1932 |
| 1,861,659 | Fox | June 7, 1932 |
| 1,993,481 | Kellett | Mar. 5, 1935 |
| 2,016,662 | Aitken | Oct. 8, 1935 |
| 2,070,792 | Kent | Feb. 16, 1937 |
| 2,087,249 | Fitch | July 20, 1937 |
| 2,117,067 | Ludington | May 10, 1938 |
| 2,127,058 | Fitch | Aug. 16, 1938 |
| 2,258,819 | Sohn | Oct. 14, 1941 |
| 2,304,116 | Fitch et al. | Dec. 8, 1942 |
| 2,304,418 | McMurry | Dec. 8, 1942 |
| 2,473,126 | Alexander | June 14, 1949 |
| 2,473,873 | Fosbender | June 21, 1949 |
| 2,489,435 | Robinson | Nov. 29, 1949 |
| 2,489,450 | Crookston | Nov. 29, 1949 |
| 2,494,696 | Forbes | Jan. 17, 1950 |
| 2,512,798 | Hodges | June 27, 1950 |
| 2,512,941 | Johnson | June 27, 1950 |
| 2,527,653 | Pierce | Oct. 31, 1950 |
| 2,685,260 | Auger | Aug. 3, 1954 |